US008413881B2

(12) United States Patent  (10) Patent No.: US 8,413,881 B2
Crackel et al.  (45) Date of Patent: Apr. 9, 2013

(54) SYSTEM OF RECEIVING PRERECORDED MEDIA DISCS FROM USERS

(75) Inventors: Dwain Crackel, Columbus, OH (US); David W. Ferguson, New Albany, OH (US); Victor A. Kean, Jr., Carroll, OH (US); Philip Pointer, Lewis Center, OH (US); Alan R. Wolf, Dublin, OH (US)

(73) Assignee: Into Great Companies, Inc., Columbus, OH (US)

( * ) Notice: Subject to any disclaimer, the term of this patent is extended or adjusted under 35 U.S.C. 154(b) by 388 days.

(21) Appl. No.: 12/709,728

(22) Filed: Feb. 22, 2010

(65) Prior Publication Data

US 2011/0204134 A1    Aug. 25, 2011

(51) Int. Cl.
*G06F 17/00* (2006.01)
(52) U.S. Cl. .................................. 235/375; 235/462.01
(58) Field of Classification Search .................. 235/375, 235/462.01, 454; 369/30.48, 30.64
See application file for complete search history.

(56) References Cited

U.S. PATENT DOCUMENTS

| | | | |
|---|---|---|---|
| 4,519,522 A | 5/1985 | McElwee |
| 4,608,679 A | 8/1986 | Rudy et al. |
| 4,668,150 A | 5/1987 | Blumberg |
| 4,814,592 A | 3/1989 | Brad et al. |
| 5,042,686 A | 8/1991 | Stucki |
| 5,143,193 A | 9/1992 | Geraci |
| 5,159,560 A | 10/1992 | Newell et al. |
| 5,206,814 A | 4/1993 | Cahlander et al. |
| 5,219,094 A | 6/1993 | Labriola |
| 5,320,219 A | 6/1994 | Ward |
| 5,418,763 A | 5/1995 | Ichikawa et al. |
| 5,523,551 A | 6/1996 | Scott |
| 5,528,566 A | 6/1996 | McGee et al. |
| 5,633,839 A | 5/1997 | Alexander et al. |
| 5,641,092 A | 6/1997 | Scott |
| 5,647,505 A | 7/1997 | Scott |

(Continued)

FOREIGN PATENT DOCUMENTS

CA    1207411 A1    7/1986
DE    202004005215 U1    7/2004

(Continued)

OTHER PUBLICATIONS

Datarius Ident Code Inspector Technical Specification, www.datarius.com, 2008.

(Continued)

*Primary Examiner* — Ahshik Kim
(74) *Attorney, Agent, or Firm* — Hahn, Loeser & Parks LLP; Arland T. Stein

(57) ABSTRACT

A system of receiving prerecorded media discs from users is disclosed. The system may include a control system having a processor capable of accessing a library associating a native bar code with the content of a prerecorded media disc and receiving the identification of a native bar code of a media disc from an optical disc identification system. The system may also include a user interface system having a buy-back activator and being adapted to receive a media disc from a user, where the user interface is capable of communicating a buy-back price to the user. An optical disc identification system may include a disc holder, a light source, a sensor capable of capturing a digital image of the hub of a media disc including a native bar code, and an image processor capable of reading the native bar code from a digital image.

58 Claims, 16 Drawing Sheets

U.S. PATENT DOCUMENTS

| | | |
|---|---|---|
| 5,673,195 A | 9/1997 | Schwartz et al. |
| 5,726,898 A | 3/1998 | Jacobs |
| 5,748,485 A | 5/1998 | Christiansen et al. |
| 5,949,876 A | 9/1999 | Ginter et al. |
| 5,988,431 A | 11/1999 | Roe |
| 6,009,057 A | 12/1999 | Furukawa et al. |
| 6,026,374 A | 2/2000 | Chess |
| 6,118,450 A | 9/2000 | Proehl et al. |
| 6,123,020 A | 9/2000 | Wolfer et al. |
| 6,201,771 B1 | 3/2001 | Otsuka et al. |
| 6,243,328 B1 | 6/2001 | Fenner et al. |
| 6,327,230 B1 | 12/2001 | Miller et al. |
| 6,327,236 B2 | 12/2001 | Yamamiya |
| 6,356,971 B1 | 3/2002 | Katz et al. |
| 6,587,031 B1 | 7/2003 | Daugherty et al. |
| 6,622,064 B2 | 9/2003 | Bartholomew et al. |
| 6,665,580 B1 | 12/2003 | Susnjara |
| 6,748,296 B2 | 6/2004 | Banerjee et al. |
| 6,997,375 B1 | 2/2006 | Green et al. |
| 7,004,392 B2 * | 2/2006 | Mehlberg et al. ........ 235/462.01 |
| 7,027,383 B2 | 4/2006 | Van Woudenberg |
| 7,110,544 B2 | 9/2006 | Gotoh et al. |
| 7,221,643 B2 | 5/2007 | Spruit et al. |
| 7,234,609 B2 | 6/2007 | DeLazzer et al. |
| 7,366,586 B2 | 4/2008 | Kaplan et al. |
| 7,444,296 B1 * | 10/2008 | Barber et al. ................... 705/17 |
| 7,503,494 B2 | 3/2009 | Shimada et al. |
| 7,844,547 B2 | 11/2010 | Amos |
| 2002/0046122 A1 | 4/2002 | Barber et al. |
| 2004/0016620 A1 | 1/2004 | Davis |
| 2004/0044697 A1 | 3/2004 | Nixon |
| 2004/0099734 A1 | 5/2004 | Barton |
| 2004/0158871 A1 | 8/2004 | Jacobson |
| 2004/0162633 A1 | 8/2004 | Kraft et al. |
| 2004/0254676 A1 | 12/2004 | Blust et al. |
| 2005/0024996 A1 | 2/2005 | Schumacher |
| 2005/0096936 A1 | 5/2005 | Lambers |
| 2005/0192829 A1 | 9/2005 | Zandt et al. |
| 2005/0230410 A1 | 10/2005 | DeLazzer et al. |
| 2005/0240958 A1 | 10/2005 | Nguyen et al. |
| 2006/0254862 A1 | 11/2006 | Hoersten |
| 2006/0259190 A1 | 11/2006 | Hale |
| 2006/0259191 A1 | 11/2006 | Lowe |
| 2006/0259192 A1 | 11/2006 | Lowe et al. |
| 2006/0259262 A1 | 11/2006 | Kuehnrich |
| 2006/0260875 A1 | 11/2006 | Hoersten |
| 2006/0265101 A1 | 11/2006 | Kaplan et al. |
| 2006/0272922 A1 | 12/2006 | Hoersten |
| 2007/0050266 A1 | 3/2007 | Barber |
| 2007/0051802 A1 | 3/2007 | Barber et al. |
| 2007/0174140 A1 | 7/2007 | Noonan et al. |
| 2007/0252003 A1 | 11/2007 | Goldring et al. |
| 2008/0114632 A1 | 5/2008 | Partee et al. |
| 2009/0073847 A1 | 3/2009 | Chpakovski |
| 2009/0276085 A1 | 11/2009 | Rudy |
| 2009/0276086 A1 | 11/2009 | Rudy |
| 2009/0276087 A1 | 11/2009 | Murray et al. |
| 2009/0326708 A1 | 12/2009 | Rudy et al. |

FOREIGN PATENT DOCUMENTS

| | | |
|---|---|---|
| DE | 202004005815 U1 | 8/2005 |
| DE | 202004005818 U1 | 8/2005 |
| EP | 2113891 A1 | 11/2009 |
| JP | S59177759 A | 10/1984 |
| JP | H02060948 A | 3/1990 |
| JP | H02141893 U | 11/1990 |
| JP | H05054510 A | 3/1993 |
| JP | H0950665 A | 2/1997 |
| JP | 2008040920 A | 2/2008 |
| WO | WO0072160 A1 | 11/2000 |

OTHER PUBLICATIONS

Xiris DO-1600 Disc Orientation System Technical Specification, www.xiris.com, Apr. 2006.

BBC News, Title: "Colour barcode system hit DVDs", 2007, http://newsvote.bbc.co.uk/mpapps/pagetools/print/news.bbc.co.uk/2/hi/technology/6570871.stm.

Xiris ID3500 Ident Code Verification System, http://www.kammann.com/enh/pdf/Xiris-ID3500.pdf.

* cited by examiner

SYSTEM OF RECEIVING PRERECORDED MEDIA DISCS FROM USERS

BACKGROUND AND SUMMARY

The present disclosure is related to a system of receiving prerecorded media discs from users.

Movies and videos games, collectively, "media," increasingly come in many formats of optical discs, with DVD and Blu-ray® being two examples of common movie formats. These media discs are purchased by consumers in ever larger quantities. Frequently, consumers tire of the movies and/or games they have previously purchased and desire to dispose of the used media discs. As a result, a used movie and game industry has developed based upon purchasing or buying-back used media discs from consumers and reselling those used media discs. This industry in essence recycles the used media discs. The user selling a used media disc is given a credit that often encourages the purchase of a new movie or game to replace the used movie or game sold back. The purchaser of the used media disc is then able to sell the used media disc to a new consumer.

Buying back used media discs from consumers has been challenging because of the difficulty in verifying the identify or content of the used media disc. The value of a media disc is determined by the content of that disc and as such the purchaser must correctly identify the disc in order to offer an appropriate buy-back price to the consumer. Errors in identifying the content of a used media disc are therefore very costly to those purchasing the used discs from consumers. As a result, the used movie and game industry has often required employees to manually identify the content of each used media disc so that an appropriate buy-back price could be offered to the consumer. This manual effort increased the cost of buying back used media discs and expands the likelihood of substantially increased shrinkage or theft of the bought back discs. There continues to be a need for improved systems and methods for receiving prerecorded media discs from consumers in order to reduce costs and streamline the buy-back transactions.

Presently disclosed is a system of receiving prerecorded media discs from users comprising a control system having a processor capable of accessing a library associating a native bar code with the content of a prerecorded media disc, receiving the identification of a native bar code of a prerecorded media disc from an optical disc identification system adapted to read a native bar code on a prerecorded media disc, identifying the content of the prerecorded media disc read by the optical disc identification system by the native bar code when in the library, directing a disc transfer system to store the prerecorded media disc in a selected location of a disc storage system, and storing in a memory of the control system the selected location and content or native bar code of each prerecorded media disc; and a user interface system operably connected to the control system and adapted to receive a prerecorded media disc from a user, and including a buy-back activator and at least one browsing and selection station operable by a user, the user interface system capable of receiving from the control system an identification of the content of the received media disc, communicating to the user a buy-back price provided by the control system for the received media disc, and directing credit of a user account for the buy-back price of the received media disc.

Also disclosed is a system of receiving prerecorded media discs from users comprising a control system having a processor capable of accessing a library associating native bar codes with content of prerecorded media discs, receiving the identification of a native bar code of a prerecorded media disc from an optical disc identification system adapted to read a native bar code on a prerecorded media disc and receiving the identification of the content of said media disc by a disc drive capable of reading at least part of the content of the prerecorded media discs, identifying the content of the prerecorded media read by the optical disc identification system and the content of prerecorded media disc identified by the disc drive, comparing the content of the received media disc identified by the native bar code with that identified by the disc drive, transferring information to a user interface when the identified contents do not match, directing a disc transfer system to store the prerecorded media discs in selected locations of a disc storage system, and storing in a memory system the selected location and content of each prerecorded media disc; and the user interface system operably connected to the control system and adapted to receive a prerecorded media disc from a user, and including a buy-back activator and at least one browsing and selection station operable by a user, the user interface system is capable of receiving from the control system an identification of the content of the received disc, communicating to the user a buy-back price provided by the control system for the received disc, and directing credit of a user account for the buy-back price of the received disc.

Also disclosed is an optical disc identification system comprising a disc holder adapted to support a prerecorded media disc to expose a center hub of the media disc, a light source positioned to illuminate at least a portion of the hub of the media disc in the disc holder, a sensor capable of capturing a digital image of at least a portion of the hub including a native bar code on the media disc, and an image processor capable of reading the native bar code from the digital image.

DETAILED DESCRIPTION OF THE DRAWINGS

Referring generally to FIGS. 1 through 16, a system of receiving prerecorded media discs from users is disclosed. As described below, the system may comprise a control system and a user interface system. The control system may have a processor capable of accessing a library associating native bar codes and content of prerecorded media discs, receiving the identification of a native bar code of a prerecorded media disc from an optical disc identification system adapted to read a native bar code on a prerecorded media disc, identifying the content of the prerecorded media disc read by the optical disc identification system by the native bar code when in the library, directing a disc transfer system to store the prerecorded media disc in a selected location of a disc storage system, and storing in a memory of the control system the selected location and content or native bar code of each prerecorded media disc. The user interface system may be adapted to receive a prerecorded media disc from a user, may be operably connected to the control system, and may include at least one browsing and selection station operable by a user and have a buy-back activator. The user interface system may be capable of receiving from the control system an identification of the content of the prerecorded media disc received from the user, communicating to the user a buy-back price provided by the control system for the prerecorded media disc, and directing credit of a user account where the user accepts the buy-back price for the prerecorded media disc received from a user. The system may be applied to prerecorded media discs including CD's, DVD's, HD DVD's, Blu-ray® discs, Wii® games, Playstation® games, Nintendo® games, Xbox® games, and other media discs that may include a native bar code.

Figure 1:
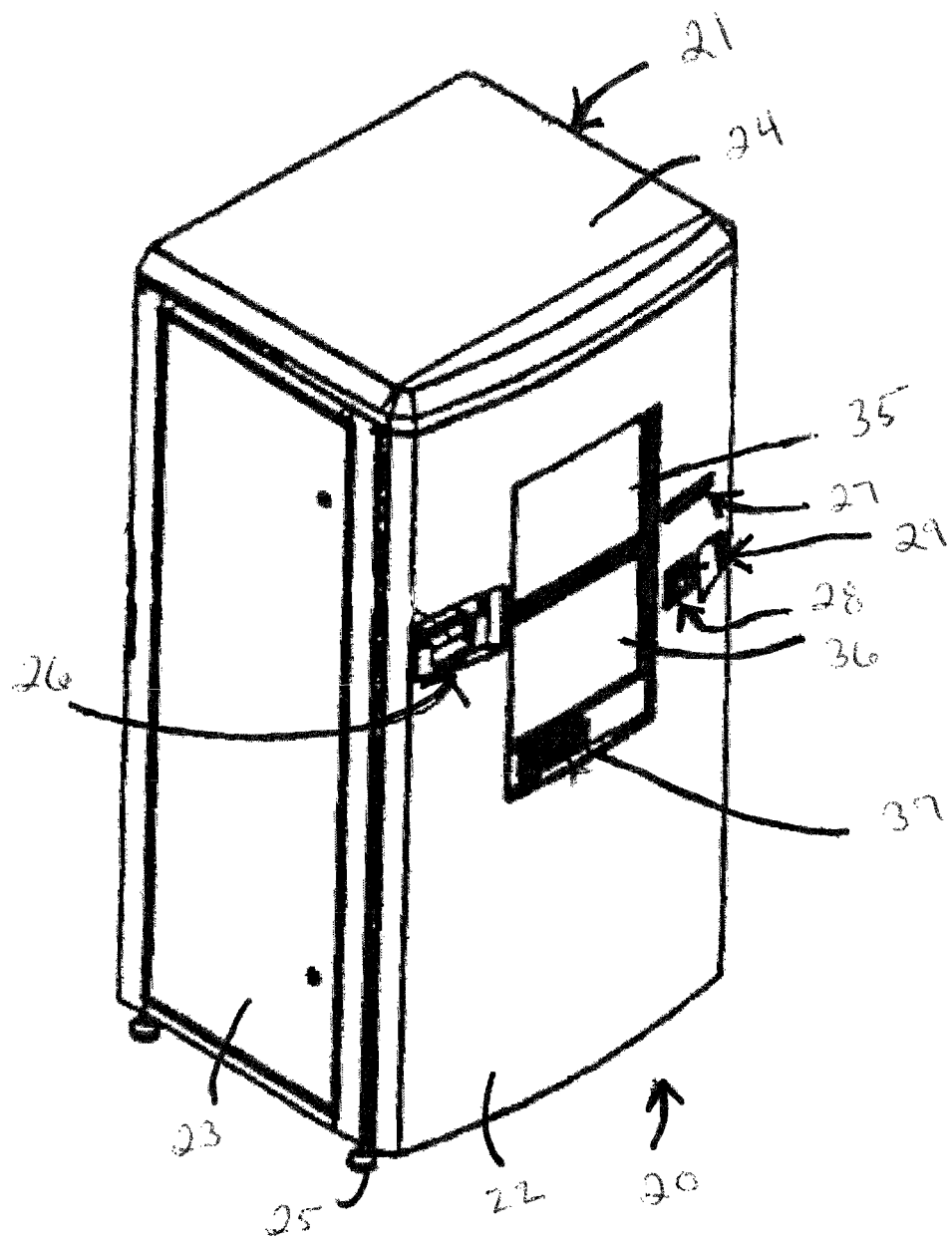
FIG. 1 is a perspective view of a kiosk for receiving prerecorded media discs from users.

The system of receiving prerecorded media discs from users may be implemented in a kiosk. Referring to FIG. 1, a kiosk 20 may include a cabinet 21 including front panel 22, side panel 23, and top panel 24. The kiosk 20 may have supports 25. The kiosk 20 may include other features such as a cover dispensing system 26, receipt printer 27, magnetic card reader 28, or bar code scanner 29. Such features may or may not be included depending upon the desired operations of the kiosk 20. The kiosk 20 may have touch screen monitors 35, 36 for communicating with a user. The kiosk 20 may also have a transfer slot 37 through which a prerecorded media disc may be passed. The prerecorded media disc may pass into or out of the kiosk 20 through the transfer slot 37 depending upon the desired operation of the system.

Alternatively, the system of receiving prerecorded media discs from users may be implemented in other configurations or devices. For example, the system of receiving prerecorded media discs from users may be implemented in a desktop or counter top device adapted to receive a limited number of media discs. For clarity, the system of receiving prerecorded media discs may be described with reference to the kiosk implementation, but it will be apparent to those of ordinary skill in the art that the system may be implemented in these other configurations and devices as well.

The system of receiving prerecorded media discs from users includes a control system having a processor capable of accessing a library associating a native bar code and content of the prerecorded media disc. The control system may be implemented in hardware, software, or a combination of hardware and software. The processor may be a computer, microprocessor, or other equivalent device capable of implementing the control system.

Figure 2A:
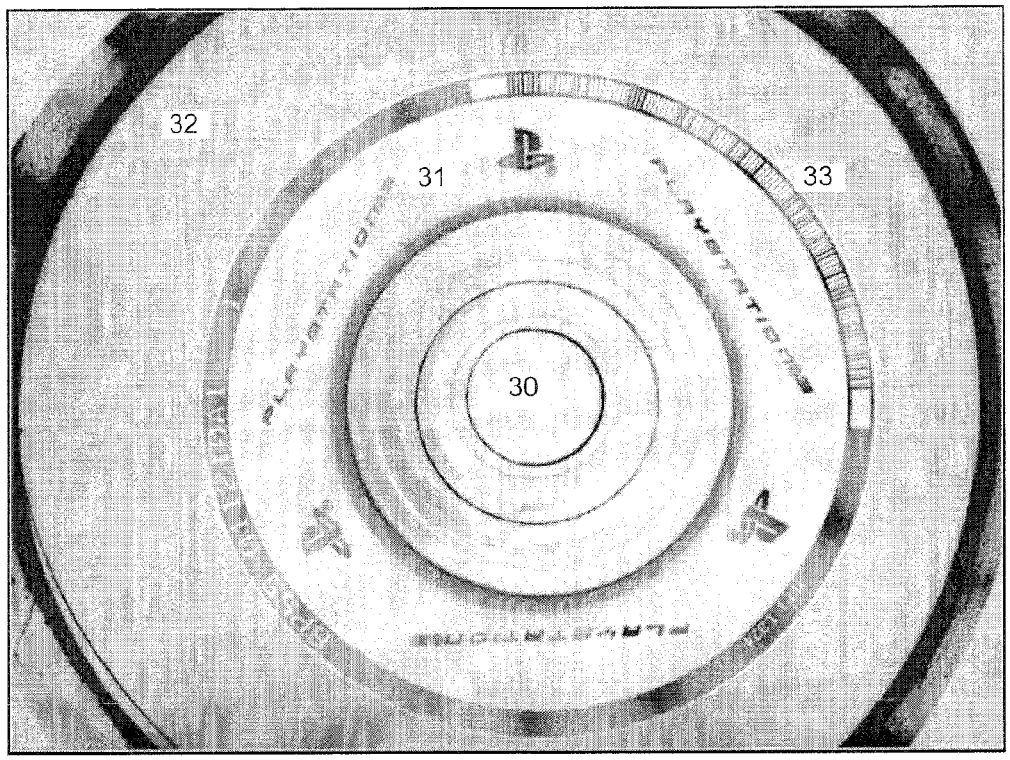
FIG. 2A is a captured image of the center hub of a prerecorded media disc including a native bar code.

A prerecorded media disc may be identified by a native bar code present on the disc. Referring to FIG. 2A, an image of the center portion of a prerecorded media disc is shown. A prerecorded media disc has a center opening 30, a hub 31, and a content portion 32. The center opening 30 is typically sized to secure the media disc to a protrusion in a jewel case or other holding device. The hub 31 may contain markings or indications of the disc. As show in FIG. 2A, the hub 31 of the media disc contains the PlayStation® logo indicating the disc is for a Playstation® game system. The content portion 32 may be described as the portion of the disc beyond the hub. For a single sided media disc, the disc may have a top side in which the content portion 32 contains artwork, and a bottom side for which the content portion 32 contains the optically readable data or disc content. For a double sided media disc, both the top side and bottom side may contain optically readable data or disc content.

Figure 2B:
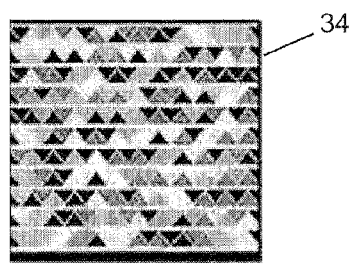
FIG. 2B is an image of another native bar code for a prerecorded media disc.

The media disc may contain a native bar code 33 as illustrated in FIG. 2A. The native bar code 33 may be located on the hub 31. Alternatively, the native bar code 33 may be located on the content portion 32, such as on part of the artwork side of a media disc. In yet another alternative, the native bar code 33 may be located on the content portion 32 overlaid with the optically readable data. The native bar code 33 may be a two-dimensional bar code as illustrated in FIG. 2A. Such bar codes typically include a pattern of alternating white and black lines of varying widths. Other bar codes include a pattern of alternating lines of various shades. The native bar code 33 may form an arc around a portion of the media disc or may be placed in a straight line. In yet another alternative, the native bar code may include other shapes or colors forming a unique pattern. Referring to FIG. 2B, an alternative native bar code 34 is illustrated that is formed from triangles of differing colors. The term native bar code as used herein is intended to encompass these various forms of identifying markings. As will be apparent, various bar code styles may be utilized with the presently disclosed system. Additional information on the placement of native bar codes on media discs is disclosed in U.S. Pat. No. 7,110,544.

The control system may have a processor capable of accessing a library associating a native bar code and content of the prerecorded media disc. The content of the prerecorded media disc may include the information necessary to uniquely identify the media disc for inventory management. For example, a given movie on DVD and the same movie on Blu-ray® may be considered to be different content and may be associated with different native bar codes. Similarly, a given game title for a Playstation® game system would be different content than the same game title for the X-Box® game system. In addition, the manufacturers of prerecorded media discs may use more than one native bar code to identify a given media disc. For example, the native bar code may be changed between manufacturing lots, or if the same title is produced by more than one manufacturer, each manufacturer may use a different native bar code for the given title. Therefore, the library may associate one or more native bar codes with a single prerecorded media disc content or title. The library may include a database, spreadsheet, or other data management system capable of maintaining the relationship between the native bar codes and the content of the prerecorded media discs.

The control system may also be capable of receiving the identification of a native bar code of a prerecorded media disc from an optical disc identification system adapted to read a native bar code on a prerecorded media disc. An optical disc identification system may be capable of identifying the native bar code on a prerecorded media disc and communicating the identification of that native bar code to the control system. Identifying the native bar code may entail identifying the format of the native bar code and, once identified, reading the native bar code. The identification of the native bar code may then be transferred to the control system as a number or in another form to be processed by the control system. In one example, the optical disc identification system may include an image sensor capable of capturing an image of the native bar code on the prerecorded media disc as described in greater detail below.

The control system may be further capable of identifying the content of the prerecorded media disc read by the optical disc identification system by the native bar code when in the library. After receiving the identification of the native bar code from an optical disc identification system, the control system may access the library to associate the native bar code to the content of a prerecorded media disc. If the native bar code is in the library, the control system may be able to identify the content or title of the prerecorded media disc associated with that native bar code. If the native bar code is not in the library, the control system may or may not be able to identify the content of the prerecorded media discs. In some implementations, the control system may attempt to acquire an identification of the content of the prerecorded media disc from the user. In other implementations the control system may attempt to acquire an identification of the content of the prerecorded media disc by employing an optical disc drive system to read data from the content portion of the prerecorded media disc. The control system may use data read from the content portion of the disc to identify the contents of the prerecorded media disc.

The control system may be further capable of directing a disc transfer system to store the prerecorded media disc in a selected location of a disc storage system, and may store in a memory of the control system the selected location and content or native bar code of each prerecorded media disc. Upon identifying the content of the prerecorded media disc, the disc may be stored in a disc storage system such as that illustrated in FIGS. 15 and 16. The control system may allocate a unique bin or storage location for each disc title such that multiple discs having the same content are stored together. Alternatively, the control system may allow prerecorded media discs having different content to be comingled in one or more bins or storage locations. The control system may store in memory the selected location and identity of each prerecorded media disc in the disc storage system. This stored information may be used to facilitate retrieval of the discs for removal from the disc storage system.

The system for receiving prerecorded media discs from users may also include a user interface system operably connected to the control system and adapted to receive a prerecorded media disc from a user. A user may interface with the system for receiving prerecorded media discs in at least two ways. First, communication between the system and the user may be provided, such as the user activating a buy-back feature of the system, the system communicating a buy-back price to the user, and the user accepting or rejecting the buy-back price. Other communication between the system and the user is also contemplated and may be performed using the user interface system. Second, a user may interface with the system to deposit a prerecorded media disc to the system and/or receive a prerecorded media disc from the system. The user interface system may encompass these and other interactions between the user and the system as desired for the system to receive a prerecorded media disc from a user.

The user interface system may be operably connected to the control system. In one example, the user interface system and control system share a physical, wired connection. In another example, the user interface system and control system may be implemented and connected strictly through software interfaces. As will be apparent to one of ordinary skill in the art, the control system and user interface system may include a variety of hardware and/or software components connected through conventional methods.

The user interface system may also be adapted to receive a prerecorded media disc from a user. The user interface system may operate in connection with hardware such as a transfer slot 37 in a kiosk 20, as illustrated in FIG. 1. In other configurations, the user interface system may receive a prerecorded media disc from a user using a tray, slide, or other suitable device for supporting a media disc.

The user interface system may include at least one browsing and selection station operable by a user. The user interface system may also include a buy-back activator. In one example, the browsing and selection station may include one or more touch screen monitors. For example, a kiosk 20 may have two touch screen monitors 35, 36 as illustrated in FIG. 1. In another example, the browsing and selection station may include a monitor for displaying information to the user and a keypad adapted for user input. The buy-back activator may be a button on a touch screen monitor or keypad that a user may press to indicate the beginning of a buy-back transaction. Alternatively, the buy-back activator may be a switch activated when the user inserts a prerecorded media disc into the user interface system. When the buy-back activator is activated by the user's action, the user interface system may communicate the beginning of a buy-back operation to the control system.

The user interface system may also be capable of receiving from the control system an identification of the content of the prerecorded media disc received from the user. The user interface system may receive the identification of the received media disc from the control system and present the identification of the received media disc to the user. The user may be able to view the identification of the received media disc to ensure the user deposited the correct disc into the system. Alternatively, the user may be asked to confirm the identification of the received media disc as confirmation that the buy-back transaction should proceed. In yet another example, the user identification system may display the identification of the received media disc as part of the scheme or background on the user interface for the remainder of a buy-back transaction.

The user interface system may also be capable of communicating to the user a buy-back price provided by the control system for the received media disc. The control system may be capable of accessing a database containing one or more buy-back prices for prerecorded media discs. The control system may use the identification of the content of the prerecorded media disc to determine a buy-back price from a buy-back price database and communicate the price to the user interface system. The user interface system may present the buy-back price for the prerecorded media disc to the user allowing the user to accept or reject the offered price. If the user accepts the offered price for the prerecorded media disc, a buy-back transaction may proceed. If the user rejects the offered price, the buy-back transaction may be terminated.

The user interface system may also be capable of directing credit of a user account where the user accepts the buy-back price for the received media disc. The user interface may direct credit of a user account for the buy-back price of a received media disc when the user accepts the buy-back price offered. The user interface may direct the control system to issue a credit or alternatively the user interface system may communicate with another system to direct credit to the user account. The user account may be a credit card account. In one example, a user may be required to present a credit card to a magnetic card reader during a transaction and the credit for the buy-back price may be applied to the user's credit card. In another example, the credit may be applied to gift card, such as a retail store gift card. The system may include or communicate with a gift card dispenser. Alternatively, the user may present a gift card to a magnetic card reader and the gift card may be credited in a manner similar to crediting of a user's credit card.

In another example, the system of receiving prerecorded media discs from users may include a control system having a processor capable of accessing a library associating native bar codes with content of prerecorded media discs, receiving the identification of a native bar code of a prerecorded media disc from an optical disc identification system adapted to read a native bar code on a prerecorded media disc and receiving the identification of the content of said media disc by a disc drive capable of reading at least part of the content of the prerecorded media discs, identifying the content of the prerecorded media read by the optical disc identification system and the content of prerecorded media disc identified by the disc drive, comparing the content of the received media disc identified by the native bar code with that identified by the disc drive, transferring information to a user interface when the identified contents do not match, directing a disc transfer system to store the prerecorded media discs in selected locations of a disc storage system, and storing in a memory system the selected location and content of each prerecorded media disc.

A disc drive, such as an optical disc drive, may be capable of reading at least a portion of the content of a prerecorded media disc. The content of the prerecorded media disc read by the disc drive may be communicated to the control system and the control system may be capable of identifying the prerecorded media disc by the data read from the media disc by the disc drive. In this manner, the control system may be capable of receiving identifying information for a prerecorded media disc from an alternative or additional source thereby allowing identification of discs for which the native bar code cannot be read or is not yet associated with a prerecorded media disc. Additionally, the control system may compare the identification of the media disc using the native bar code with the identification of the media disc using the disc drive to confirm that the independent identifications are consistent. This may provide a method for verifying the accuracy of the native bar code identification or accommodating those discs that do not contain a native bar code. If the identifications of the prerecorded media discs do not match, the control system may direct the user interface to alert the user to the error. The control system may also terminate a buy-back transaction if the identifications do not match. The ability to identify the content of a media disc using both the native bar code and an optical disc drive provides additional flexibility for the control system and may permit the system to handle a greater variety of media discs.

Figure 3:
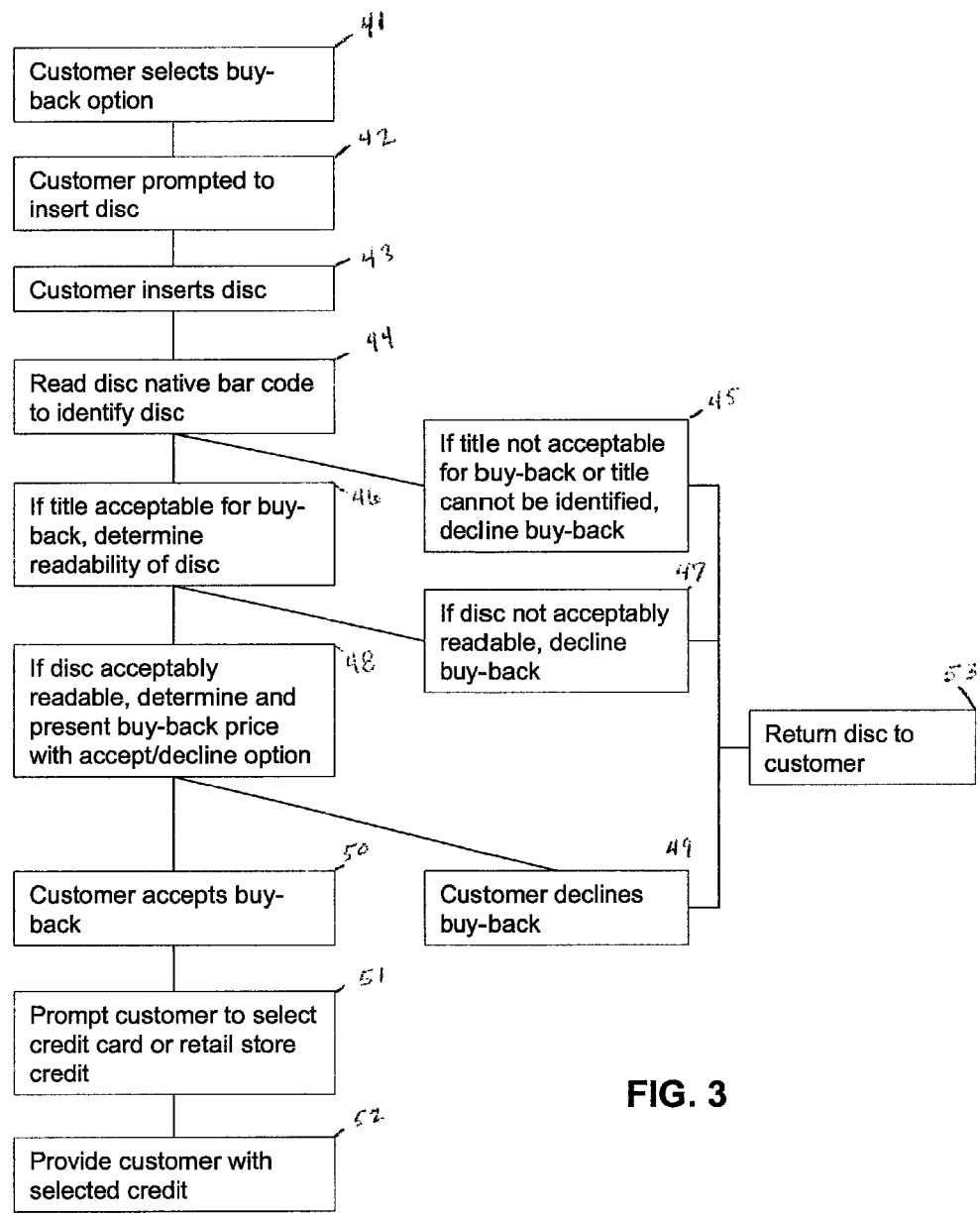
FIG. 3 is a flowchart illustrating operation of a system of receiving prerecorded media discs from users.
Figure 4:
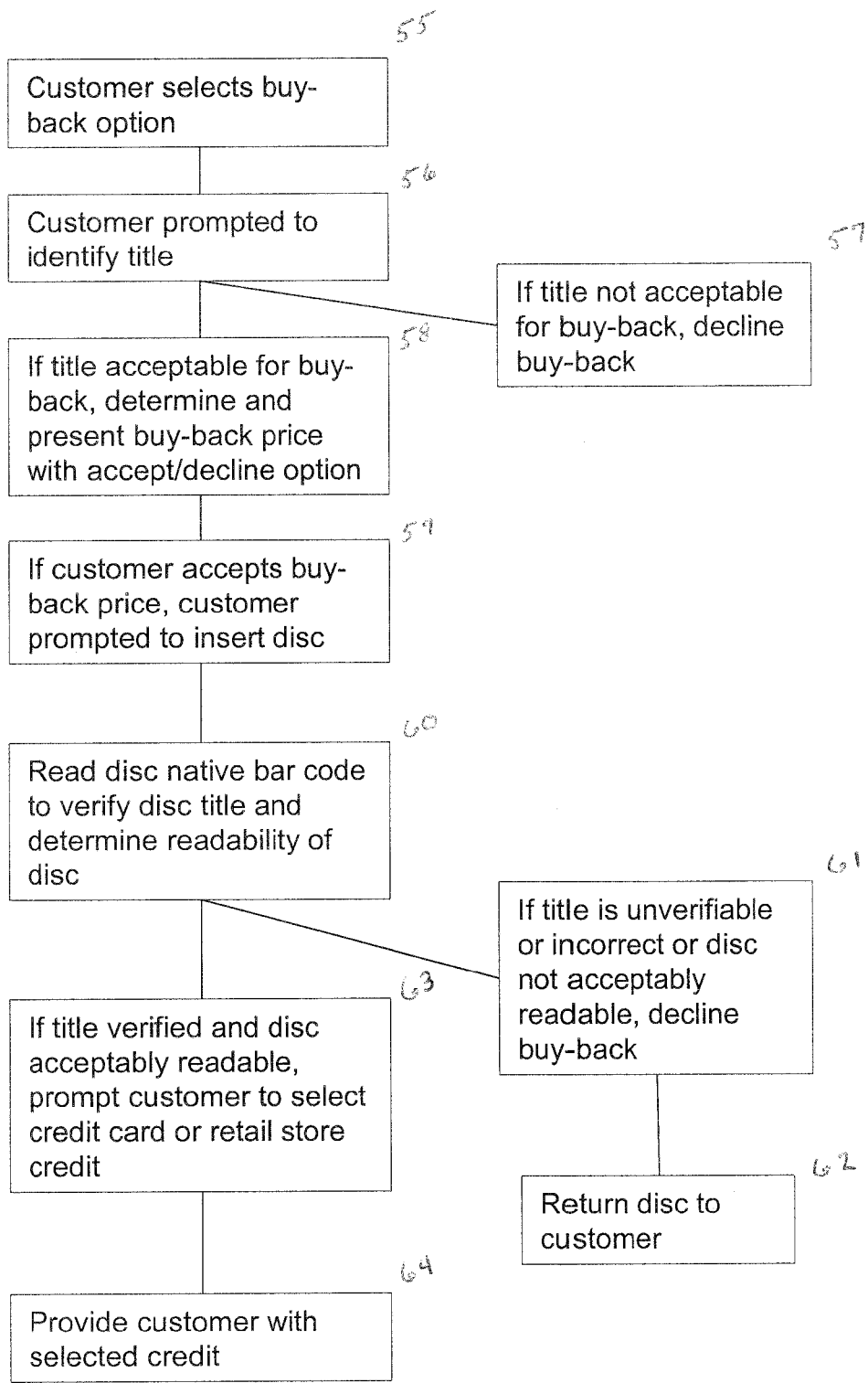
FIG. 4 is a flowchart illustrating an alternative operation of a system of receiving prerecorded media discs from users.

Referring generally to FIGS. 3 and 4, illustrative examples of the operation of the system of receiving prerecorded media discs from users are shown. Referring to FIG. 3, a user or customer may select the buy-back option, such as by activating the buy-back activator of the user interface system (41). The customer may then be prompted to insert or deposit a prerecorded media disc (42) such that the user interface system may receive the disc from the user (43). If a native bar code is present on the received disc, the native bar code may be read by an optical disc identification system and the identification of the native bar code communicated to the control system so the control system may identify the content of the received disc, such as the disc title (44). If the disc title is not acceptable for buy-back or if the contents of the disc or disc title cannot be identified, the buy-back transaction may be terminated (45) and the disc returned to the user (53). Whether or not a specific disc is acceptable for buy-back may depend upon the title of the disc, the quality or readability of the disc, or other factors that may be specified. In one example, if the disc title is acceptable for buy-back the system may then determine the readability of the disc (46). The readability of the disc may be determined by transferring the disc to an optical disc drive and verifying that the contents of the disc may be successfully read. Alternatively, the readability of a disc may be determined by transferring the disc to a disc quality measuring device, such as the Checkflix Certifier device. If the disc is not acceptably readable, the system may terminate the buy-back transaction (47) and return the disc to the user or customer (53). If the disc is acceptable for buy-back, the control system may determine a buy-back price, such as by accessing a buy-back price database as previously discussed, and the buy-back price for the prerecorded media disc may be presented to the user through the user interface system (48). If the user declines or rejects the offered buy-back price, the transaction may be terminated (49) and the disc returned to the user (53). If the customer accepts the offered buy-back price for the media disc (50), the user may be prompted to select the type of credit desired, such as a credit to the user's credit card or retail store credit (51). The system may then direct a credit for the buy-back price to be issued in accordance with the user's selection (52).

Referring to FIG. 4, an alternative sequence for operation of the system of receiving prerecorded media discs from users is shown. The user or customer may select the buy-back option, such as by activating the buy-back activator of the user interface system (41). The customer may then be prompted to identify the contents of the prerecorded media disc, such as the title of a movie or game and the format of the disc such as DVD or Blu-ray® (56). If the disc identified by the user is not acceptable for buy-back, the transaction may be terminated (57). If the disc identified by the user is acceptable for buy-back the control system may determine a buy-back price for the identified disc and communicate the buy-back price to the user interface system for presentation to the customer (58). If the customer accepts the buy-back price, the customer may be prompted to deposit the prerecorded media disc (59). The native bar code of the received disc may be read and the control system may verify that the user identification of the disc matches the identification of the disc using the native bar code (60). In some embodiments, the readability of the disc may also be evaluated as described above (60). If the contents of the disc cannot be verified, the native bar code identification does not match the user identification, or the disc is not acceptably readable, the system may terminate the buy-back transaction (61) and return the received disc back to the user (62). If the disc contents are verified and the disc is otherwise acceptable for buy-back, the system may prompt the user to select the type of credit desired, such as a credit to the user's credit card or a retail store credit (63). Finally the system may direct a credit in the amount of the accepted offered buy-back price to be issued according to the user's selection (64).

Figure 5:
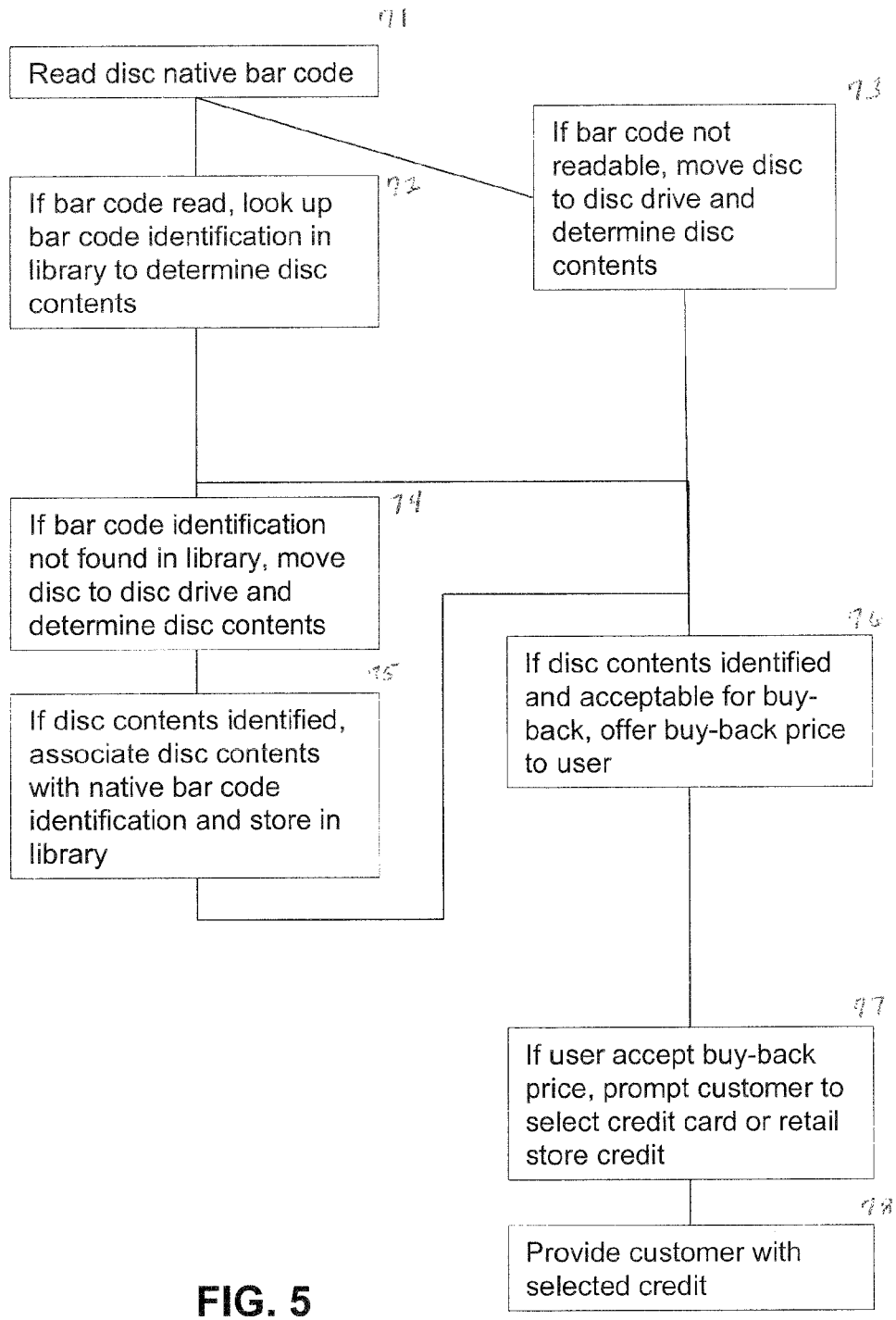
FIG. 5 is a flowchart illustrating a method for identifying a prerecorded media disc.
Figure 6:
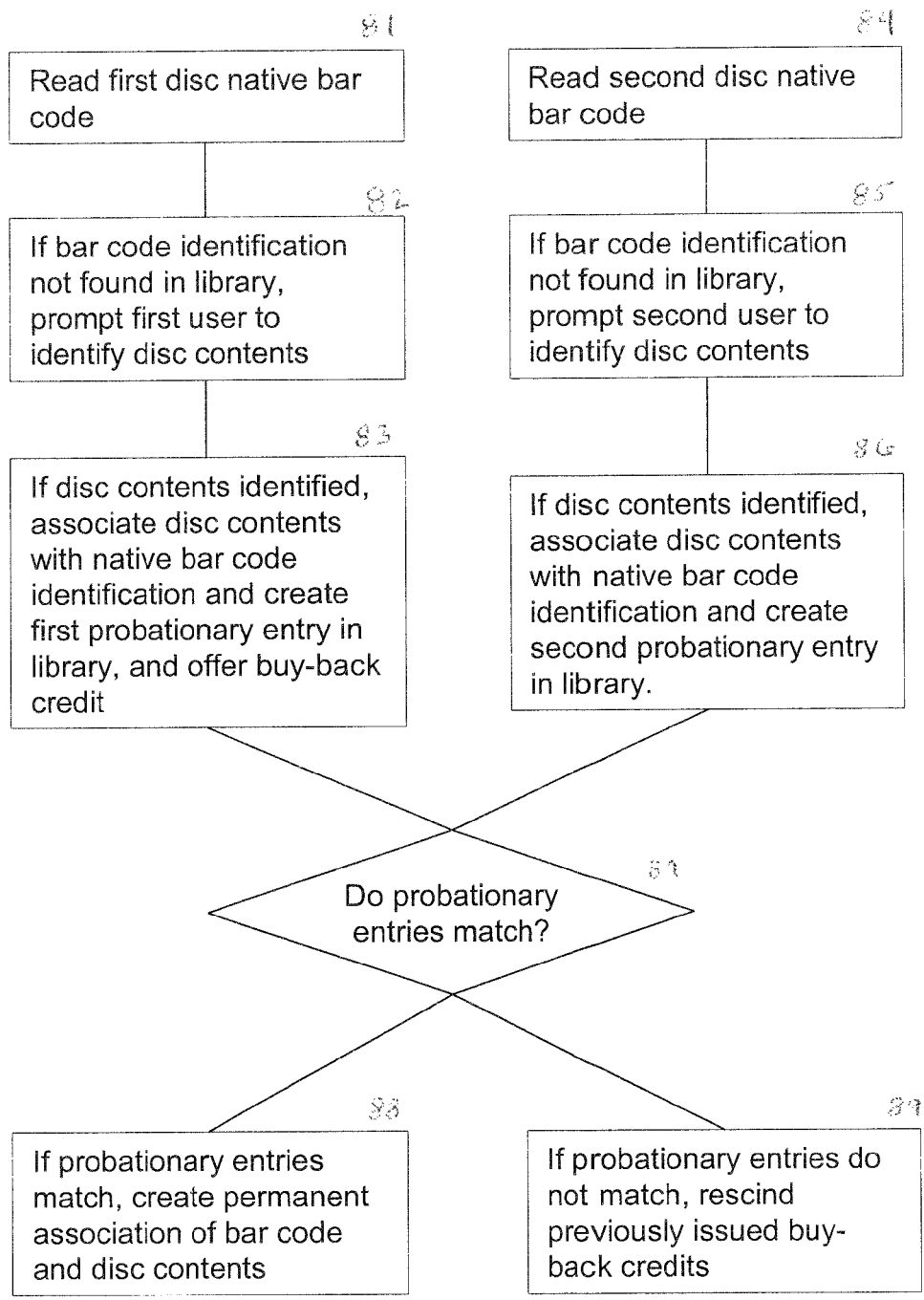
FIG. 6 is a flowchart illustrating an alternative method for identifying a prerecorded media disc.

Referring now to FIGS. 5 and 6, the control system may identify the contents of the prerecorded media discs using the native bar code in a variety of ways. Referring to FIG. 5, after a prerecorded media disc has been received by the user interface system, an optical disc identification system may read the native bar code on the receive disc (71). If the native bar code is successfully read, the identification of the native bar code may be communicated to the control system and the control system may access the library associating native bar codes with the content of prerecorded media discs to identify the disc (72). Alternatively, if the native bar code is not successfully read, the control system may direct a disc transfer system to move the received disc to an optical disc drive to determine the contents of the disc (73). If the native bar code is successfully identified but the library does not contain an association of that native bar code to the contents of a media disc, the media disc may also be moved to an optical disc drive to determine the disc contents (74). If the disc contents are identified by the optical disc drive, the contents of the prerecorded media disc may be associated with the native bar code on the prerecorded media disc and the association stored in the library for future use (76). If the contents of the prerecorded media disc are successfully identified and the disc is acceptable for buy-back, the control system may determine a buy-back price and offer the buy-back price to the user through the user interface system (76). If the user accepts the offered buy-back price, the user may be prompted to select the type of credit desired (77) and the system may direct a credit in the amount of the buy-back price to be issued according to the user's selection (78). As described above, the system of receiving prerecorded media discs may or may not have access to one or more optical disc drives capable of reading the prerecorded media discs. If an optical disc drive is not present, the buy-back transaction may be terminated by the system when the disc contents cannot be identified.

Referring to FIG. 6, another method of identifying the contents of prerecorded media discs using the native bar code is illustrated. In this example, a user identification of the disc contents may be temporarily relied upon to dynamically build the library associating native bar codes with contents of prerecorded media discs. A first user may present a first disc to the system of receiving prerecorded media discs, and the native bar code on the first disc may be read by an optical disc identification system (81). Assuming the native bar code is not found in the library, the user may be prompted to identify the contents of the prerecorded media disc deposited to the system (82). The user identification of the first disc content may then be temporarily associated with the native bar code of the first disc read by the optical disc identification system to create a first probationary entry in the library, and a buy-back price offered relying upon the user's identification of the disc contents (83). Subsequent to the first user presenting a first disc, a second user may present a second disc and the native bar code on the second disc may be read by an optical disc identification system (84). If the native bar code is not found in the library or is only found in a probationary entry, the user may be prompted to identify the disc contents (85). The user identification of the second disc content may then be temporarily associated with the native bar code of the second disc read by the optical disc identification system to create a second probationary entry in the library (86). A determination may then be made as to whether the first probationary entry and the second probationary entry match indicating that two separate users have consistently identified the contents of prerecorded media discs having the same native bar code (87). If the probationary entries match, a verified association of the native bar code with the contents of the prerecorded disc as identified by the user may be stored in the library, and the second user may be offered a buy-back credit for the received disc (88). If the probationary entries do not match, the system may decline to offer the second user a buy-back price due to the uncertainty in the identification of the disc contents and the credit previously issued to the first user may be rescinded (89).

As will be apparent, the system of receiving prerecorded media discs from users may be operated in numerous ways in addition to the examples given in FIGS. 3 through 6 above. For example, the sequence of steps may be altered and various steps may be added or omitted to produce the desired transaction process for a user. Additionally, using the methods described in FIGS. 5 and 6, the library associating native bar codes with the content of prerecorded media discs may be automatically updated and expanded as media discs having native bar codes not previously identified are presented to the system. In this manner, the system may grow and adapt and the costs associated with maintaining the library may be reduced.

The system of receiving prerecorded media discs from users may also include other features and capabilities as described below. The user interface system may be capable of transferring a received prerecorded media disc to an optical disc identification system. Alternatively, the optical disc identification system may be part of the user interface system and be adapted to read the received prerecorded media disc on receipt of the media disc from the user. The optical disc identification system and user interface system may thus be separate components or may be integrated within the overall system. In one example, the optical disc identification system may be integrated with a transfer slot 37 of a kiosk 20 as illustrated in FIG. 1 such that the user interface system may receive a disc directly into the optical disc identification system.

The user interface system may also be capable of receiving an identification of the content of the prerecorded media disc from the user and communicating such user identification to the control system. The control system may be capable of comparing a user identification of the content of the prerecorded media disc with the content identified by the native bar code. The system may utilize the user identification for various purposes. For example, the user may be asked to identify the disc so that the system may determine and offer a buy-back price prior to the disc being received by the user interface system. If the user declines the buy-back price, this would reduce wear on the system because the user could decline to insert the disc. Alternatively, the user identification may serve as confirmation that the media disc has been properly identified by the optical disc identification system. In yet another alternative, the user may be asked to identify the disc to provide an activity for the user while the system is processing the disc. By providing activity for the user, the system may be more user friendly and the user's attention may be drawn to advertising or other marketing information displayed on the user interface system.

The optical disc identification system may also be capable of checking the quality of the received media disc. Various techniques are presently known for assessing the quality or readability of an optical media disc. The quality or readability of a media disc may thus be determined as part of the operations of the system of receiving prerecorded media discs. By assessing the quality, only those discs meeting a predefined quality measure may be bought-back from the user thereby reducing costs associated with defective or damaged discs. The user interface system may also be capable of dispensing back to the user a received disc that does not meet a given quality standard. The quality standard may be established based upon the requirements of the system owner and may be changed as desired. Additionally, a different quality standard may be established for different types of media discs if desired. In yet another example, a measure of the quality of the received media disc may be transferred to the control system and the control system may adjust the buy-back price displayed to the user based upon the measured quality of the received disc. In this manner, the system may buy-back low quality or defective media discs at a discount thereby providing a benefit to the user and encouraging continued use of the system. In some cases, low quality or defective media discs may be repaired or refurbished and sold at a discount.

The system of receiving prerecorded media discs from users may also include a communication system capable of at least periodically updating a buy-back price database with prices for used prerecorded media discs. A buy-back price database may be stored locally by the system for use during normal operations. Alternatively, the buy-back price database may be stored on a central or regional server and accessed as required by the system. The buy-back price database may be updated periodically or continually by the communication system. In this manner, the buy-back price database may better reflect current market prices for the used media discs being bought-back by the system and allow for more cost effective operation of the system.

The control system may also be capable of instructing the user interface system to dispense back to the user a received disc that cannot be identified by the native bar code. The disc may be dispensed back through a transfer slot 37 such as is illustrated in FIG. 1. The disc may also be dispensed back by allowing the user to access the media, such as by opening a door or tray exposing the media disc so the user may retrieve the disc.

The control system may also be capable of identifying a prerecorded media disc whose native bar code is not present in the library and updating the library associating such native bar code with the content of the prerecorded media disc. As previously described with respect to FIGS. 5 and 6, the control system may identify a media disc whose native bar code is not present in the library by receiving data from an optical disc drive reading the contents of the media disc. Alternatively, the control system may receive an identification of the contents of the prerecorded media disc from the user through the user interface system. The control system may rely upon these alternative identifications with or without additional verification, and update the library associating the native bar code with the content of the media disc as desired.

The library associating native bar codes with the content of prerecorded media discs may be stored locally with the control system or may be located at a central or regional location and accessed through a communication network. If stored locally, the library may be updated periodically, for example daily or weekly, from a server or central library upon which multiple control systems rely. Additionally, a library may communicate with a plurality of control systems and may be capable of verifying an association of a newly added native bar code with the content of a prerecorded media disc identified by one or more control systems. The library may serve as a central repository of all associated native bar codes and may integrate information received from multiple control systems to update and add to the library.

The control system may be capable of directing the debit of a credit previously issued to a user in the amount of the buy-back price paid for a received media disc when the control system is unable to verify the association between the native bar code and the identification of the content of the prerecorded media disc.

The system of receiving prerecorded media discs from users may also include receiving the jewel case or other type of case for the media disc from the user. In one example, the user interface system may be capable of reading a bar code from a case associated with the content of the prerecorded media disc. The case bar code may be read using a bar code scanner 29 of a kiosk 20 as illustrated in FIG. 1. Alternatively, other bar code scanners may be used. The case bar code may be a UPC code or similar bar code applied to the case of the media disc.

The user interface system may also be capable of transferring such identification of the bar code from the case to the control system, and the control system may be capable of comparing the disc content associated with the case bar code with the disc content associated with the native bar code of the received disc identified by the optical disc identification system. The control system may also be capable of directing the user interface system to inform the user when the disc content associated with the native bar code does not agree with the disc content associated with the case bar code.

The optical disc identification system may be capable of capturing a digital image of at least a portion of a center hub of a received media disc containing a native bar code and reading the native bar code from the digital image of the hub of the received media disc. An example of a captured digital image of a received disc is shown in FIG. 2A. As illustrated the captured image includes the center opening 30, the hub 31, and may include a portion of the content portion 32 of the media disc. The captured image also includes the native bar code 33. The native bar code 33 may be identified in the captured image and decoded by an image processor or a control system to identify the content of the native bar code so that the content of the prerecorded media disc can be determined.

The system of receiving prerecorded media discs may be applied to systems handling bare discs. Here bare discs refer to media discs that are not in a case such as a jewel case or other covering. The ability to access the surface of the disc may facilitate identification of the native bar code and may facilitate the use of optical disc drives to read the content of the prerecorded media discs. In another configuration, the system of receiving prerecorded media discs may be applied to systems capable of handling prerecorded media discs in a case where the optical disc identification system is capable of reading the native bar code on the received media disc through a window in the case. For example, a typical jewel case may be configured with a window or opening positioned to expose the hub of a prerecorded media disc housed in the case thereby allowing the optical disc identification system to identify the native bar code from the hub of the media disc. Similarly a paper or plastic sleeve may be configured with an opening positioned to expose the hub of the media disc allowing for identification of the native bar code.

Referring now to FIGS. 7 through 13, an example optical disc identification system is illustrated. An optical disc identification system may include a disc holder adapted to support a prerecorded media disc to expose a center hub of the media disc, a light source positioned to illuminate at least a portion of the hub of the media disc in the disc holder, a sensor capable of capturing a digital image of at least a portion of the hub including a native bar code on the media disc, and an image processor capable of reading the native bar code from the digital image. The optical disc identification system may also include a mirror positioned to reflect an image of a surface of the media disc illuminated by the light source, where the sensor is capable of capturing the reflected image from the mirror of at least a portion of the surface of the media disc through an opening in the center hub of the media disc, and the image processor is capable of comparing the reflected image captured by the sensor with a library of art work associated with the content of prerecorded media discs to identify the content of the media disc.

Figure 7A:
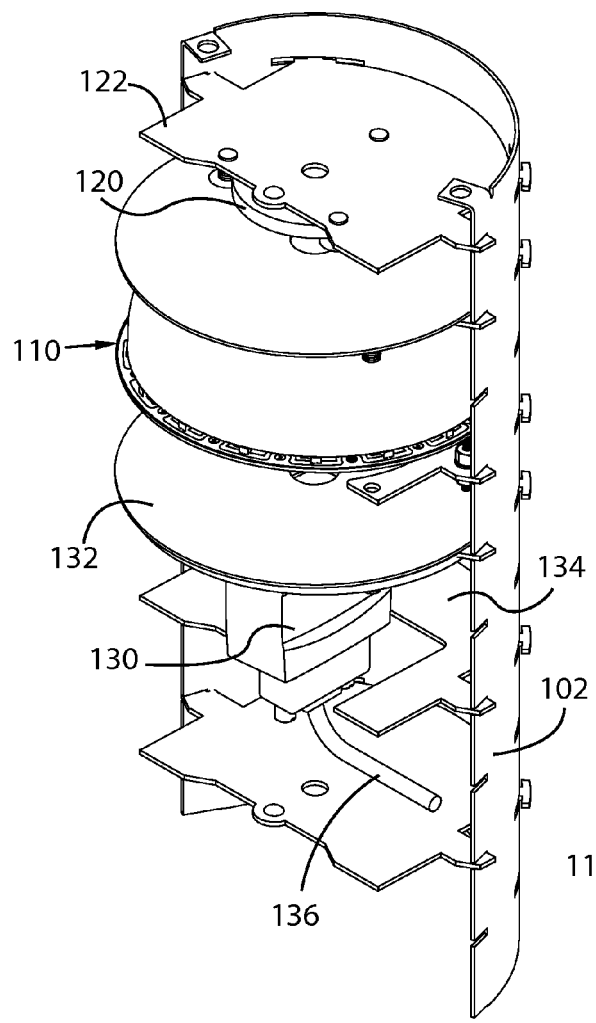
FIGS. 7A-7B illustrate an optical disc identification system.
Figure 7B:
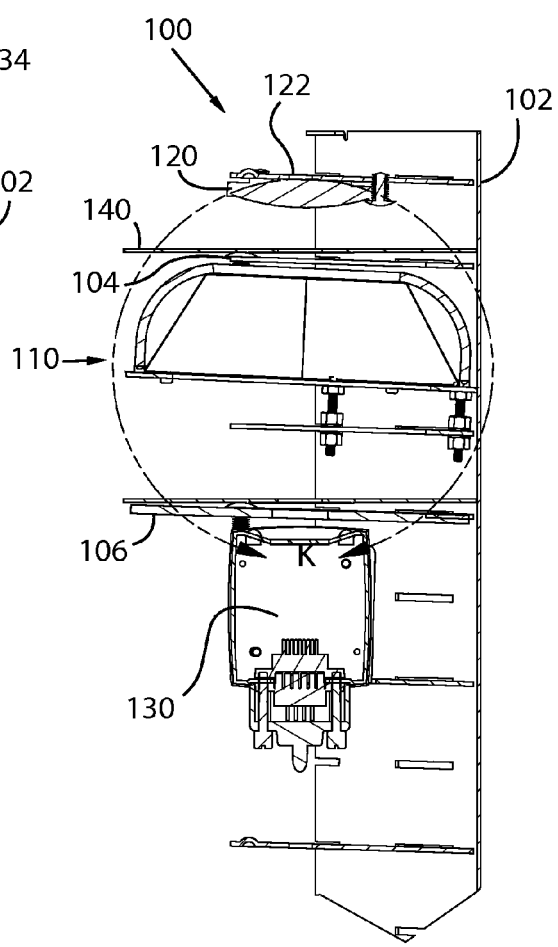

Referring to FIGS. 7A and 7B, a perspective view and cross-section view of an example optical disc identification system 100 are illustrated. The optical disc identification system 100 is illustrated in a generally vertical or upright fashion, but it will be apparent the disc identification 100 system may be inverted or arranged in other configurations consistent with this disclosure. As shown in FIG. 7A, the optical disc identification system 100 may be housed in a partial tube 102 or other structure suitable for supporting the components of the optical disc identification system 100. The partial tube 102 may have an inner radius slightly larger than the radius of a prerecorded media disc to accommodate media discs while reducing the overall space requirements. In one example, the media discs may have a diameter of about 120 mm. Other structures of differing shapes and configurations may be utilized to support the optical disc identification system and the support structure may be designed to integrate into the environment in which the optical disc identification system will be employed.

The optical disc identification system 100 may have a first disc holder 104, a light source 110, and a sensor 130. The first disc holder 104 may be adapted to support a prerecorded media disc while exposing a center hub of the media disc. The light source 110 may be positioned to illuminate a least a portion of the hub of the media disc supported by the first disc holder 104. The sensor 130 may be capable of capturing a digital image of at least a portion of the hub of the media disc including a native bar code.

In one example, the sensor 130 may be a digital image sensor capable of capturing digital images. The sensor 130 may be secured to a sensor support 134 to position the sensor 130 in the desired location within the optical disc identification system 130. The sensor 130 may have a cable 136 or other equivalent connection for communication with an image processor or control system. The sensor 130 may be controllable and configurable through software, and the sensor 130 may be able to transmit the captured digital images to an image processor or other control system for subsequent processing. In another example, the sensor may contain an integrated image processor capable of processing the captured images. The sensor 130 may be able to capture one or more images in rapid succession and may transmit multiple images to an image processor or control system. A sensor shield 132 may be provided to reduce interference from excess or stray light sources that may reduce the quality of the captured digital images. An example sensor shield 132 is illustrated in FIGS. 13A-B. The sensor shield 132 may be a disc approximately 120 mm in diameter with a center opening 138 corresponding to the center opening of a prerecorded media disc. The sensor shield 132 may be made of an opaque material. Alternatively, the sensor shield 132 may be coated or painted to limit the passage of light other than through the center opening.

Figure 8:
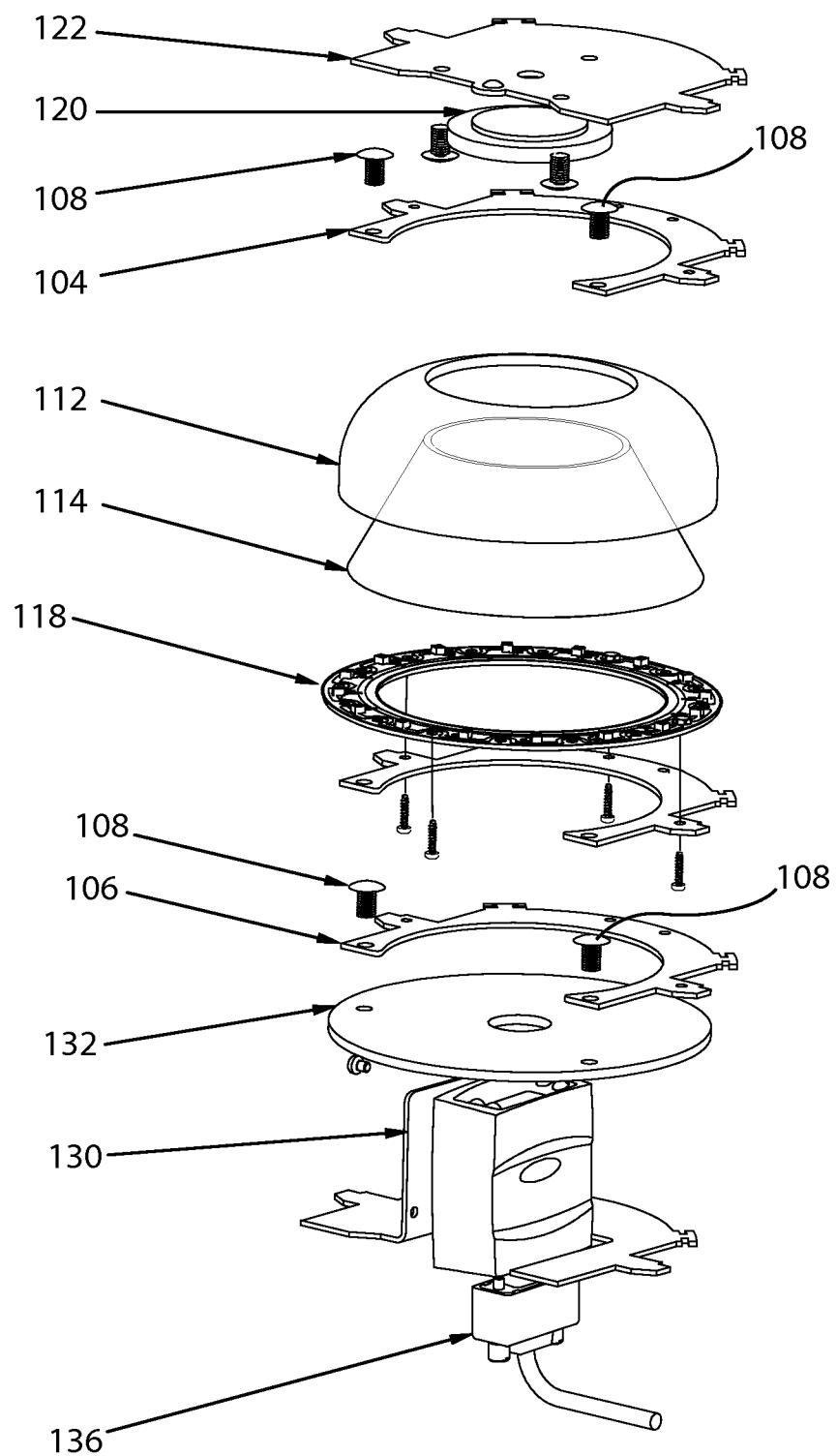
FIG. 8 is an exploded view of the optical disc identification system of FIG. 7.

The optical disc identification system 100 may also have a light source 110. The light source may be capable of illuminating at least a portion of the center hub of a prerecorded media disc. The light source 110 may also be capable of illuminating at least a portion of the surface of a prerecorded media disc. As shown in FIG. 8, the light source 110 may include a light guide 112, a light shield 114, and a plurality of light emitting diodes ("LED's") 118. The optical disc identification system may also include a first disc holder 104 and a second disc holder 106. The first disc holder 104 and the second disc holder 106 may each also include a pair of disc supports 108. In the example shown in FIG. 8, the first disc holder 104 and the second disc holder 106 are positioned on opposite sides of the light source 110.

The disc supports 108 may contact the content portion of the media disc and form a pivot axis for the media disc to facilitate transfer of the disc within the optical disc identification system. By placing the disc supports 108 under the content portion of the media disc, the center hub of the media disc 140 remains visible to the sensor 130 so that the native bar code on the media disc may be read. The disc supports 108 may be formed of a non-scratching material to avoid damaging the content portion of the media disc.

The light source 110 may be positioned to illuminate at least a portion of the hub of a media disc when the media disc is supported by the first disc holder 104. The light source 110 may also be capable of illuminating a surface of the media disc when the media disc is supported by the second disc holder 106. In one example, the media disc may be transferred between the first disc holder 104 and the second disc holder 106 to facilitate identification of each side of the media disc.

Figure 9:
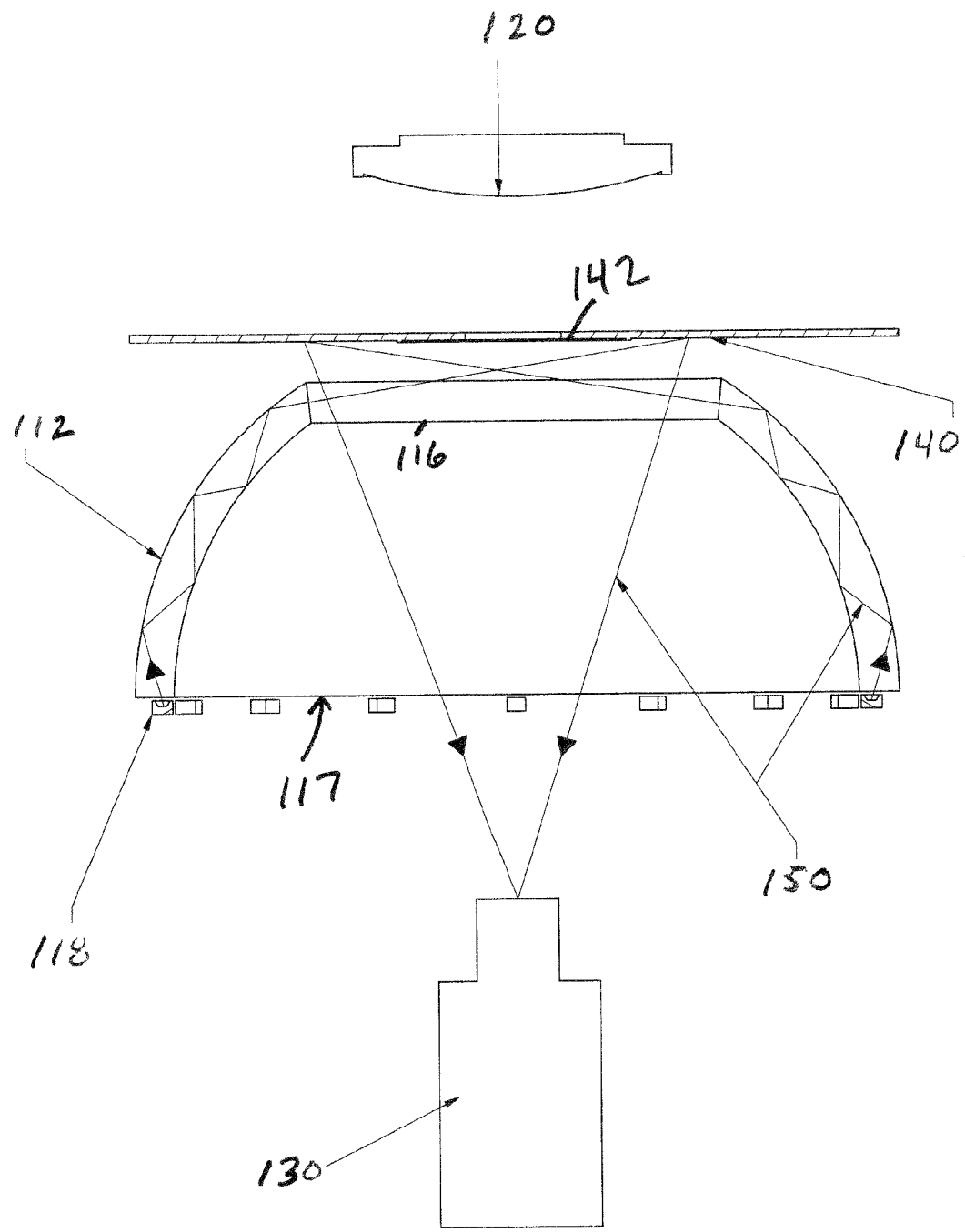
FIG. 9 is a schematic view of the optical disc identification system reading a native bar code.
Figure 10:
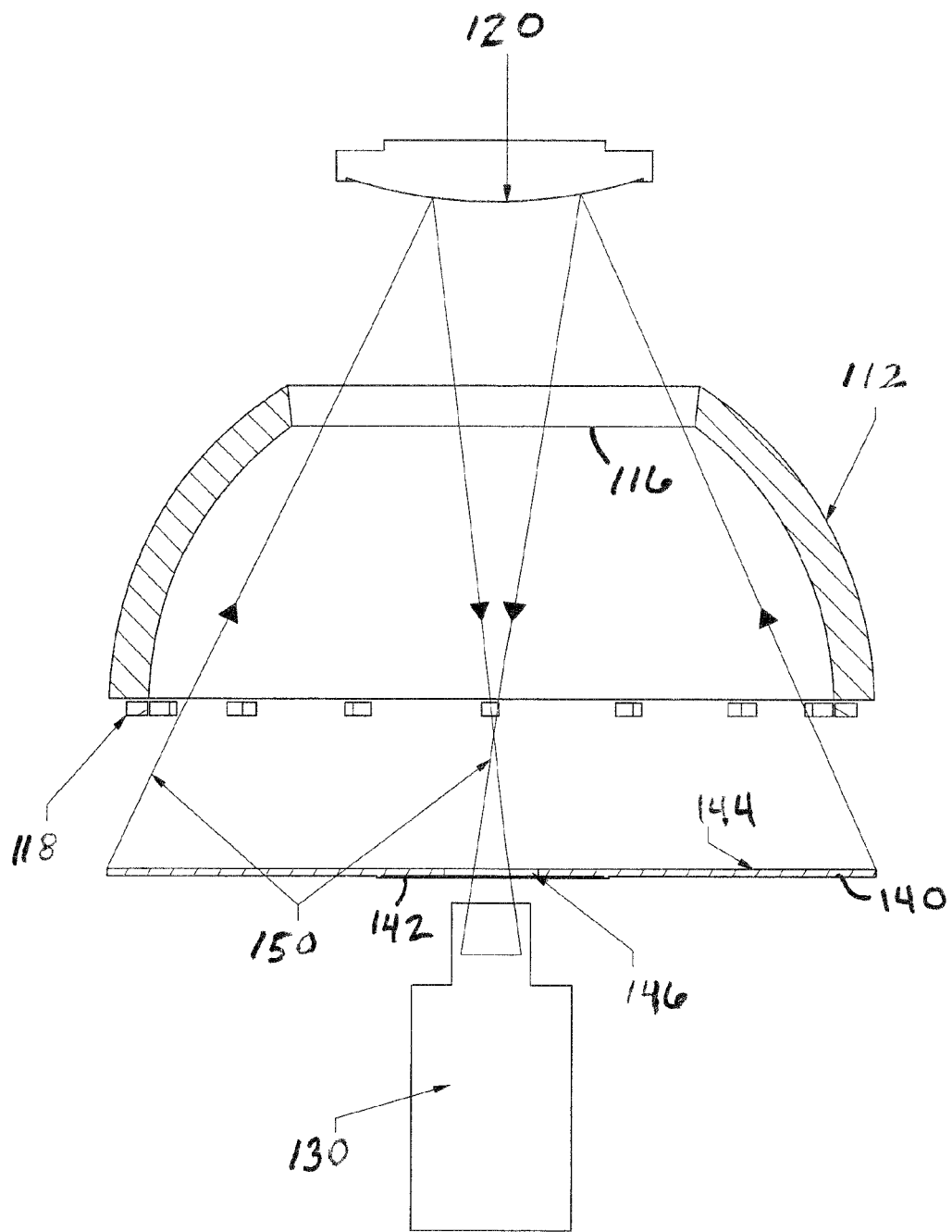
FIG. 10 is a schematic view of an optical disc identification system reading the top side of a prerecorded media disc.
Figure 11:
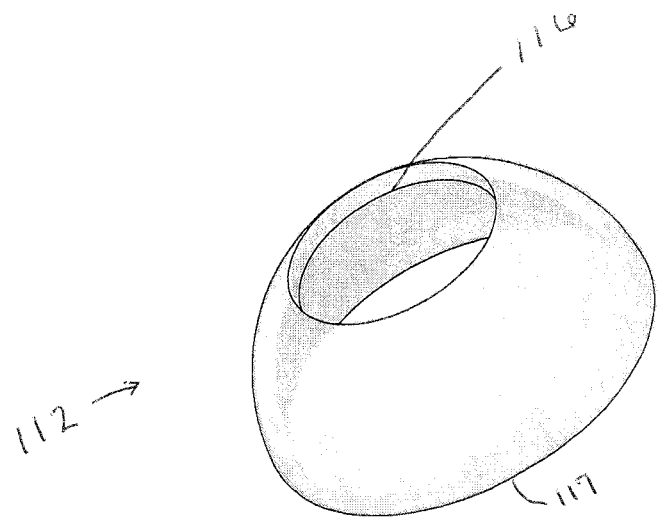
FIG. 11 illustrates the light guide of the optical disc identification system of FIG. 7.
Figure 11:
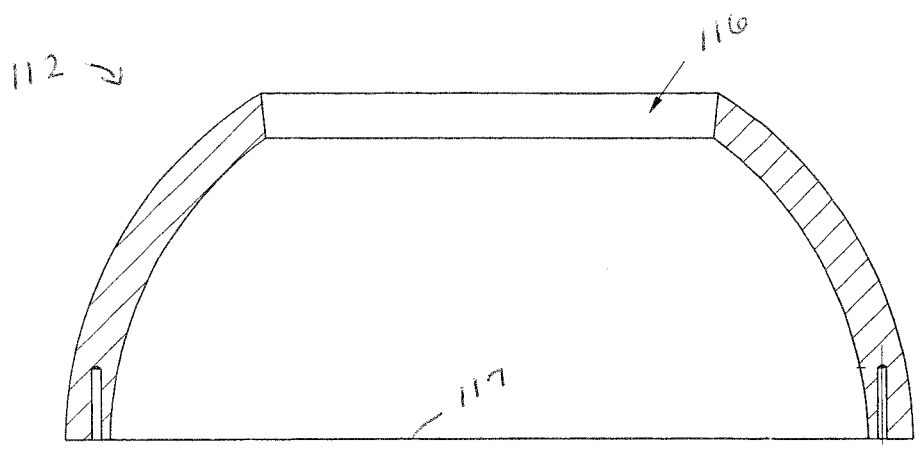

The light source 110 may include a light guide 112 capable of directing light produced by the plurality of LED's 118 to a ring opening 116, illustrated in FIGS. 9-11. Referring to FIG. 9, a schematic illustration of the optical disc identification system configured to capture a digital image of the hub of a media disc is illustrated. As shown, a media disc 140 may be positioned above the ring opening 116 of the light guide 112 and supported by a disc holder (not shown in FIG. 9). The light source 110 may cause light emitted from a plurality of LED's 118 or other light sources to be directed to the ring opening 116 to illuminate the hub 142 of the media disc 140. The light emitted at the ring opening 116 illuminating the hub 142 of the media disc 140 may be referred to as indirect light, dispersed light, or diffused light. It has been found that illuminating the hub 142 of the media disc 140 with indirect light can improve the readability of the native bar code on the media disc 140. In this context, indirect light may refer to light incident on the media disc at an acute angle relative to the media disc. In one example, light incident at approximately 6° was found to provide desirable results. In another alternative, the light emitted at the ring opening 116 may be incident on the media disc at an angle between, for example, 5° and 30°.

Figure 12:
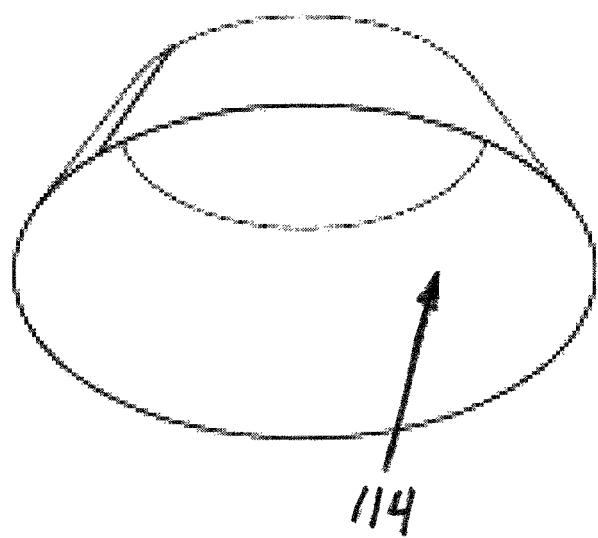
FIG. 12 illustrates the light shield of the optical disc identification system of FIG. 7.
Figure 13:
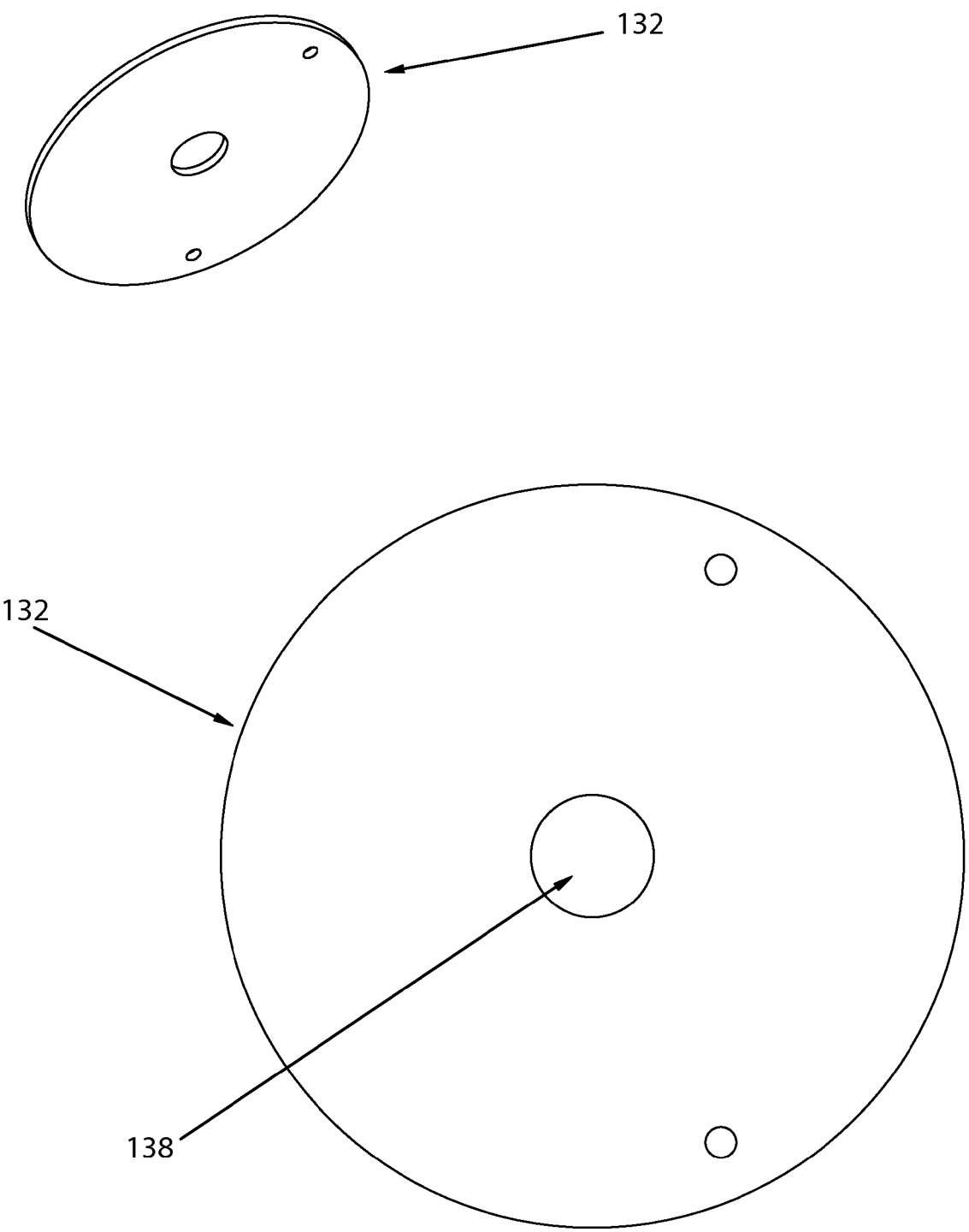
FIG. 13 illustrates the sensor shield of the optical disc identification system of FIG. 7.

The light guide 112 may be formed of translucent plastic or other material capable of reflecting the light produced by the plurality of LED's 118. The light guide 112 may be generally dome shaped with a ring opening 116 and a bottom opening 117 opposite the ring opening. An example of a light guide 112 is illustrated in FIG. 11. It has been found that by limiting the radius of curvature of the light guide 112, the light produced by the LED's may be reflected within the light guide 112 such that the light produced by the LED's is directed through the light guide from the bottom opening 117 to the ring opening 116. The radius of curvature may be selected to achieve reflection of the light within the light guide 112 and may be determined based upon the refraction index of the material from which the light guide is formed. In one example, to achieve reflection of the light in the light guide 112, the angle of incidence of the light within the light guide 112 may be limited to less than approximately 42° when the light guide has a refraction index of approximately 1.49. Additionally, the light guide 112 may diffuse the light from the individual LED's to form a generally uniform distribution of the intensity of light emitted at the ring opening 116. In another alternative, a commercially available ring light source may be provided for use with the optical disc identification system. A light shield 114 may also be provided within the light guide 112 to limit interference of the light emitted at the ring opening 116 and light emitted at the bottom opening 117. The light shield 114 may be an opaque ring such as is illustrated in FIG. 12. Other configurations of the light shield 114 may also be constructed, and the light shield may be integrated with the light guide 112. In one example, the light shield 114 may be an opaque coating applied to the inner surface of the light guide 112 that limits interference between the light sources. In other examples, additional light shields may be provided above or below the light guide 112 to reduce interference from reflected or ambient light, or other undesired light sources. For example, a light shield having a center opening corresponding to the ring opening 116 of the light guide 112 may be provided above the light guide 112 to improve the captured image of the hub of a media disc.

Referring to FIG. 9, light path 150 is represented reflecting with the light guide 112, contacting the hub 142 of the media disc 140, and passing through the ring opening 116 and bottom opening 117 of the light guide to be received by the sensor 130. In this configuration, the light source 110 illuminates the hub 142 of the media disc 140 and the sensor 130 may capture a digital image of the hub of the media disc including a native bar code. In the configuration illustrated in FIG. 9, the mirror 120 may not be used.

Referring now to FIG. 10, a schematic view of the optical disc identification system is illustrated configured for capturing a digital image of the surface of a media disc 140. In this configuration, the light source 110 illuminates a surface 144 of the media disc 140. For one-sided discs, the surface 144 of the media disc may be referred to as the artwork side or top side of the disc. For two-sided discs both the top side and bottom side of the disc may contain data, and any artwork may be confined to the central hub portion of the disc. A native bar code may be present on the hub 142 of the media disc on either the top side or bottom side. Additionally, a native bar code may be present within the artwork or other identifying features on the surface 144 of the media disc.

The light source 110 may also be capable of illuminating the surface 144 of the media disc 140. The LED's 118 may direct light from the bottom opening towards the surface 144 of the media disc. As shown, an image of the surface 144 of the media disc 140 may be reflected in the minor 120 and captured by the sensor 130. The sensor 130 may capture the image reflected from the mirror 120 through the center opening 146 of the media disc. By using a minor, the optical distance between the surface 144 of the media disc 140 and the sensor 130 is increased allowing the sensor to view a larger portion of the surface of the media disc. In one example, the sensor 130 may have an adjustable focal length, and the focal length of the sensor 130 may be set based upon the position of the media disc on the first disc support or second disc support.

The optical disc identification system may employ a single sensor. A single sensor design may reduce the material cost for the system. In another example (not shown), two sensors may be used with the optical identification system. A second light source may be positioned to illuminate at least a portion of a surface of the media disc opposite the first light source. A second sensor may be provided to capture a digital image of at least a portion of the surface of the media disc illuminated by the second light source and transfer that image to an image processor or control system. A two sensor system may permit capturing an image of both sides of a prerecorded media disc without moving the prerecorded media disc and therefore reduce the total time required to capture images of both sides. For example, the two sensors may capture images of the sides of a prerecorded media disc simultaneously, or may capture images of the side of the media disc sequentially.

The digital image captured by a sensor in an optical disc identification system may be transferred to an image processor. One example of a captured digital image of the hub of a media disc is illustrated in FIG. 2A. The image processor may be integrated with the sensor, integrated with a control system, or may be a separate processor capable of analyzing the captured image. The image processor may be a general purpose processor programmed to process the captured image or may include customized image processing hardware. Many such image processors are available and may be used with the optical disc identification system.

The image processor may be capable of reading the native bar code from the digital image. As described above with reference to FIGS. 2A and 2B, the captured image may contain a native bar code. The image processor may be adapted to identify the location of the native bar code within the captured image and read or decode the native bar code. The image processor may also be capable of comparing an image of a surface of a media disc captured by the sensor with a library of art work associated with the content of prerecorded media discs to identify the content of the media disc. Numerous techniques are known for image comparison and may be used with the image processor. For example, it may be necessary to scale or rotate the captured image prior to comparing the captured image with artwork from a library. The image processor may also include character recognition software capable of identifying and reading textual information from the surface of the media disc represented in the captured image.

Figure 14:
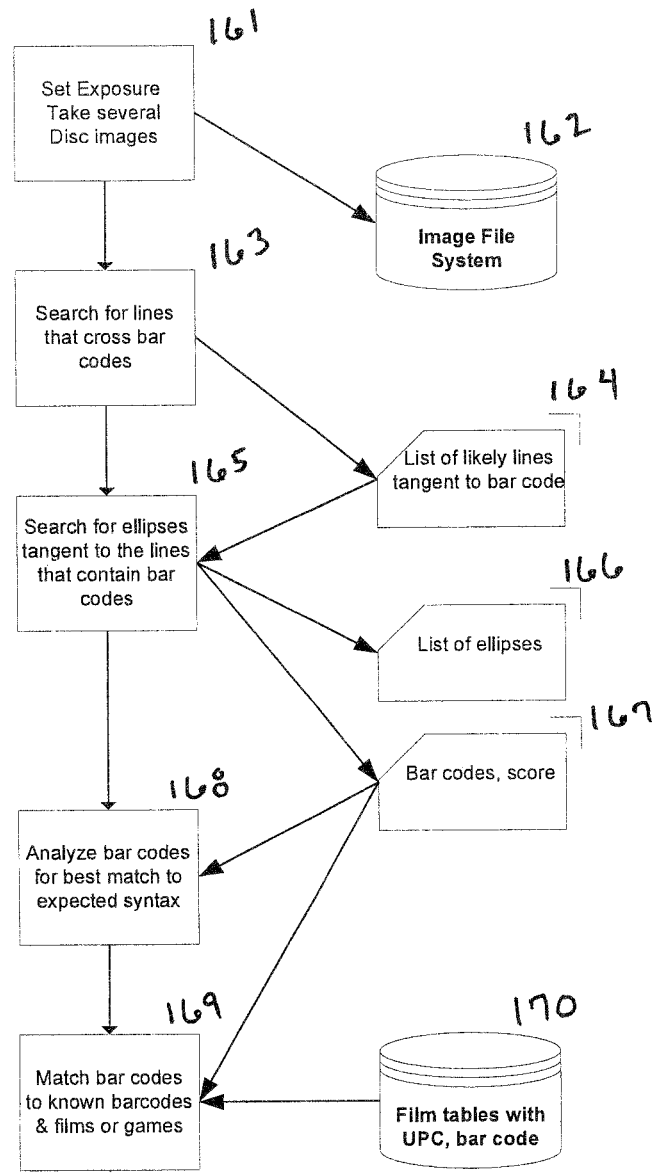
FIG. 14 is a flowchart illustrating a method for reading a native bar code and identifying the content of a prerecorded media disc.

The image processor may use a variety of methods to identify the native bar code from a captured image. Referring now to FIG. 14, an example method of the operation of the optical disc identification system is illustrated. It will be apparent that numerous variations and alterations of this technique may be employed within the scope of the present disclosure.

The optical disc identification system may capture one or more digital images of the hub of a media disc (161). Multiple images may be captured by the sensor and the sensor may be adjusted, such as by varying contrast and brightness settings, to achieve a desired quality of the captured image. The captured images may be stored in an image file system (162). The captured images may be stored for subsequent processing by the optical disc identification system. Additionally, the captured images may be stored for later use to evaluate system performance. For example, captured images may be transferred for evaluation by maintenance personnel overseeing the performance of the optical disc identification system. Once an acceptable captured image is acquired, the image processor may select a linear section of the digital image and determine if the linear section intersects a portion of the native bar code. In one example, the image processor may identify a list of lines or linear segments likely to be tangent to a native bar code (164). As shown in FIG. 2, the native bar code may form an arc within the captured image and, in some cases, the identified linear segment may not intersect the entire length of the native bar code. Once one or more lines or linear segments are identified approximately tangent to the native bar code in the captured image, the image processor may identify circles or ellipses tangent to the linear segments (165). The circles or ellipses may be adapted to identify a circle or ellipse that intersects at least a portion of the native bar code. In some configurations, the pair of disc supports may position the prerecorded media disc such that the disc is not perpendicular to the sensor. In this configuration, the captured image of the prerecorded media disc may appear as an ellipse rather than a circle, and using ellipses to read the native bar code may be more efficient. Alternatively, the image processor may pre-process the captured image to correct for the offset caused by the disc supports prior to identifying the native bar code. In any case, the native bar code may then be read along the intersecting circle or ellipse. In one example, the image processor may identify an approximate location of the center of the media disc and map concentric ellipses from successive approximations of the center of the media disc to identify and read the native bar code of the media disc. In this example, a list of circles or ellipses may be utilized (166). Using the information of the native bar code read along the intersecting circle or ellipse, the image processor may identify one or more possible values for the bar code. Due to limitations of the sensor, dirt or other obscurations on the media disc, or other factors, the image processor may not be capable of reading the entire bar code. In such circumstances, the image processor may identify several possible bar codes conforming to the portion of the native bar code that is readable, and the image processor may assign a score to those possible native bar codes (167). The score may represent the likelihood that a possible native bar code is the correct native bar code for a given prerecorded media disc. In another example, the image processor may be capable of reading a portion of a native bar code and reporting the identified portion of the native bar code to a control system. The control system may then be able to compare the possible native bar codes matching the portion reported by the image processor with an alternative identification of the prerecorded media disc, such as a user identification or an identification achieved using an optical disc drive as previously discussed. The image processor may also compare the native bar code identified in the captured image to the expected syntax for known native bar codes (168). Native bar codes, like many marking systems, may have a predefined syntax or structure that permits a system to verify that the entire bar code has been decoded. For example, a bar code syntax may define a specific starting and ending pattern such that the beginning and end of a bar code may be identified. Other bar code syntaxes may specify a specific length for the bar code or provide a checksum as is commonly used for error checking purposes. If a native bar code is successfully identified by the image processor, the identification of the native bar code may be used to identify the content of the prerecorded media disc (169). For example, a library associating native bar codes with the content of the prerecorded media discs may be accessed (170). Such a library may also associate UPC bar codes or other identifying information to the content of prerecorded media discs.

In another example, the captured image may be scanned to identify a native bar code by searching for tangent lines that cross a barcode, searching for ellipses that cross a at least a portion of a barcode, decoding at least a portion of a barcode; and selecting barcodes that best match the known pattern of the barcode portion.

To find a tangent line that crosses a barcode, multiple tangent lines may be identified. An ellipse centered at the center of the captured image may be identified. In one example, the ellipse has a radius of approximately one-half of the length of the diagonal of the captured image and lines tangent to the ellipse may be identified every three (3) degrees around the ellipse. The radius of the ellipse may be reduced and additional tangent lines identified as necessary until a tangent line intersects a portion of a barcode in the captured image. To detect the presence of a barcode intersecting a tangent line, the captured image is sampled along a tangent line. To improve performance, additional pixels of the captured image may be sampled on either side of the tangent line. Sampling multiple pixels and applying a median filter to the pixel values may filter or reduce distortions caused by errant light or dark pixels in the captured image. Additional process steps, such as average or other filtering of the pixel values, may also be employed to improve the performance of the system. For a grey-scale image, the sampled data from the captured image represents the relative brightness or darkness of the image along the tangent line. The transitions between these areas of relative brightness and darkness may then be analyzed for transition patterns corresponding to the syntax of known barcode formats. For instance, the Code 39 bar code has a known starting and ending pattern and a defined syntax for the bars between the starting and ending pattern. Using a histogram of bar widths the image processor may detect the presence of a bar code. Other bar code formats may be identified by cross-correlation of the sampled data with a typical barcode format, where a high correlation indicates a portion of a bar code has been identified. Other image processing techniques may be employed to detect the presence of a bar code intersecting a tangent line, and in some examples, multiple techniques may be employed for each barcode style to increase the likelihood of detection.

Once a tangent line intersecting a bar code is identified, the center of the identified bar code portion may be determined. Ellipses may then be generated tangent to the tangent line and intersecting the center of the identified bar code portion. The ellipses may be formed based upon the distortion of the captured image resulting from the media disc not being perpendicular to the image sensor. Alternatively, the captured image may be preprocessed to reduce or eliminate that distortion, in which case circles rather than ellipses may be appropriate. In any case, ellipses of varying radius may be generated and the captured image may be sampled along the ellipse as described above. Again the sampled data is analyzed to detect transitions between bars of the barcode in the captured image. Depending upon the specific barcode syntax different techniques may be used. For Code 39, it has been found that creating a histogram of the width of bars identified in the sampled data is effective for identifying the presence of a barcode in the sampled data.

Once at least a portion of a barcode is identified, the barcode may be decoded or converted into characters to be processed by the image sensor or control system. Each barcode format has a predetermined syntax that may be used to decode the barcode. For example, a typical Code 39 barcode on a DVD movie is represented by a six (6) digit number between the starting and ending markers. Other bar code formats may include different numbers of characters and some formats include a checksum or other validating characters. If an entire barcode is not readable, the portion of the barcode that is identified may be compared against known barcode syntaxes to identify matches with known patterns. In this manner the optical disc identification system may be able to determine the native bar code of a prerecorded media disc even if a portion of the barcode is obscured or otherwise not readable.

An optical disc identification system may employ the methods described above to identify a native bar code. Alternatively, other methods may be implemented using the system presently disclosed. Other features such as error checking and error reporting may also be incorporated as is customary for such systems.

Figure 15:
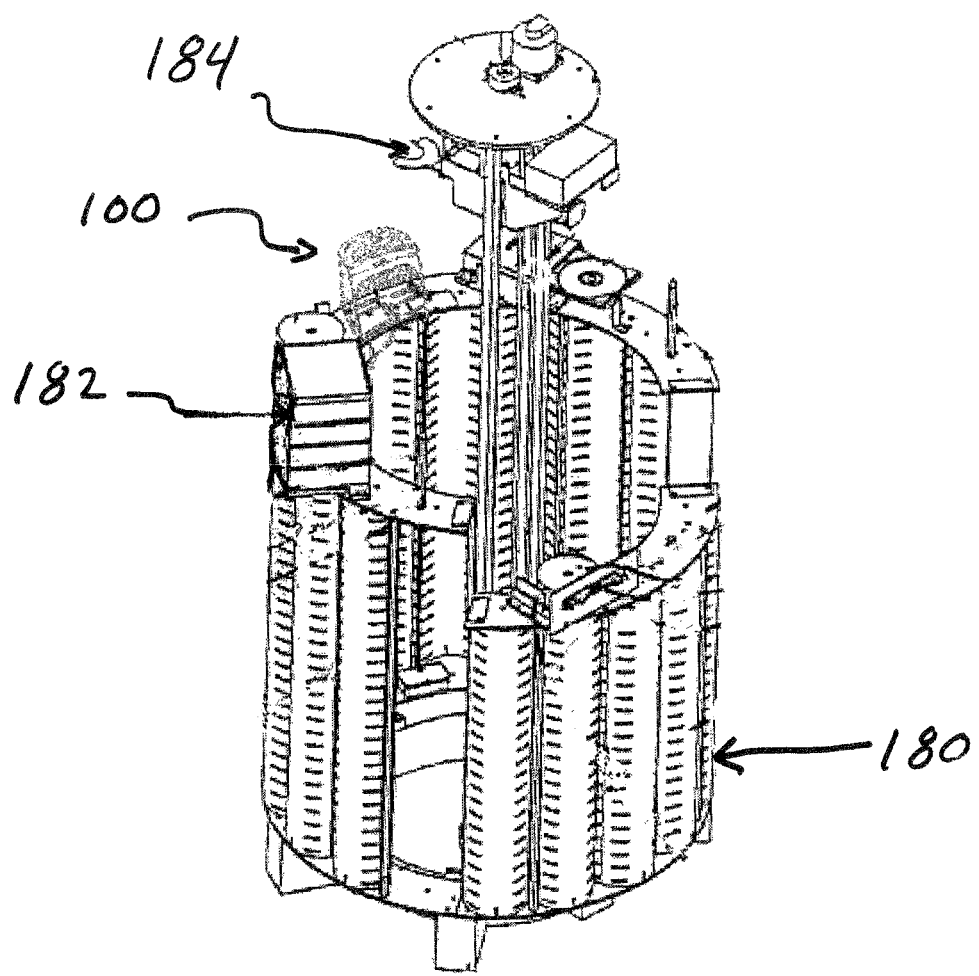
FIG. 15 is a perspective view illustrating an installation of an optical disc identification system in a kiosk.
Figure 16:
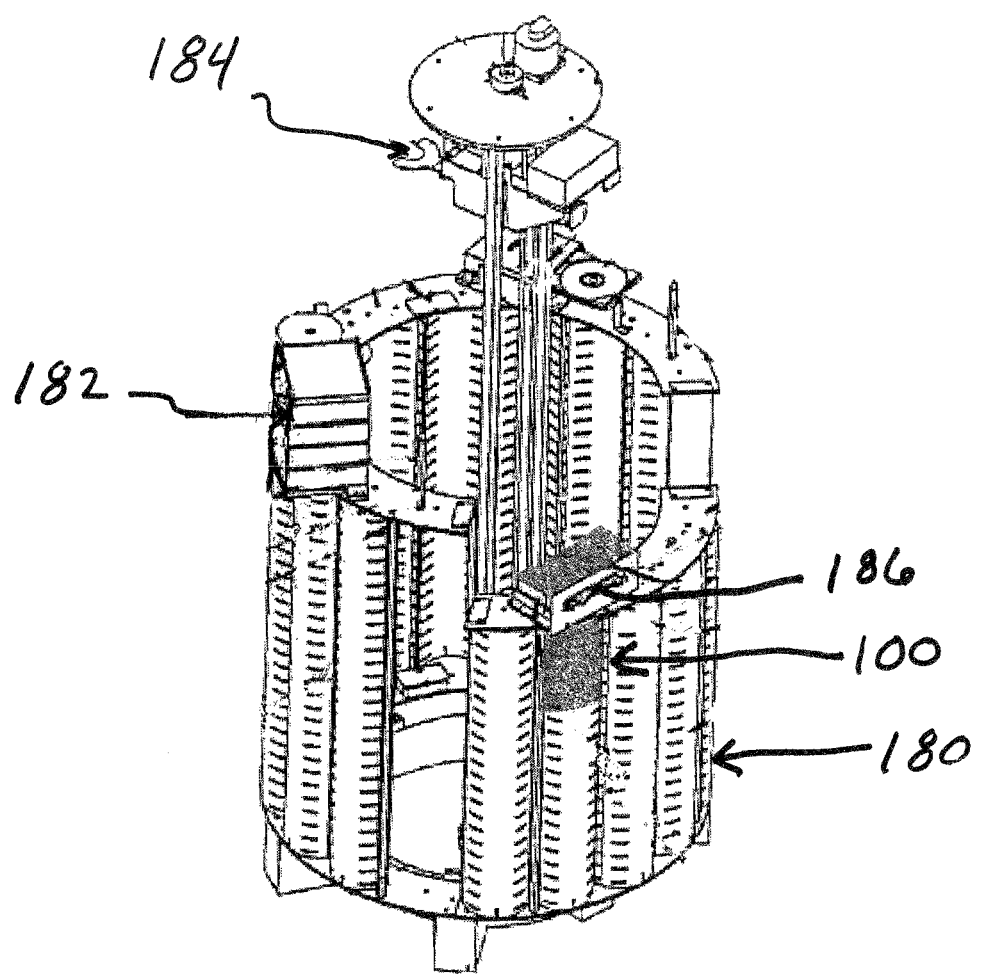
FIG. 16 is a perspective view illustrating an alternative installation of an optical disc identification system in a kiosk.

Referring now to FIGS. 15 and 16, an optical disc identification system is illustrated integrated into a kiosk. A kiosk may include a drum 180 adapted to store media discs. As previously discussed, the system for receiving media discs from users may interface with a disc drive system 182 and a disc transfer system 184. As one example, the disc drive system 182 and the disc transfer system 184 are illustrated in connection with the drum 180 of a kiosk. The optical disc identification system may be supported by the drum 180 of a kiosk. In FIG. 15, the optical disc identification system 100 is shown installed proximate to the disc drive system 182 and supported on the drum 180. In FIG. 16, the optical disc identification system 100 is shown integrated with the transfer slot 186. As previously discussed, the optical disc identification system may be integrated with or part of the user interface system such that the native bar code on the media disc may be read upon receipt of the media disc from the user.

While certain embodiments have been described, it must be understood that various changes may be made and equivalents may be substituted without departing from the sprit or scope. In addition, many modifications may be made to adapt a particular situation or material to the teachings of the disclosure without departing from its spirit or scope.

What is claimed is:

1. A system of receiving prerecorded media discs from users comprising:
    a control system having a processor capable of accessing a library associating a native bar code with the content of a prerecorded media disc, receiving the identification of a native bar code of a prerecorded media disc from an optical disc identification system adapted to read a native bar code on a prerecorded media disc, identifying the content of the prerecorded media disc read by the optical disc identification system by the native bar code when in the library, directing a disc transfer system to store the prerecorded media disc in a selected location of a disc storage system, and storing in a memory of the control system the selected location and content or native bar code of each prerecorded media disc, and
    a user interface system operably connected to the control system and adapted to receive a prerecorded media disc from a user, and including a buy-back activator and at least one browsing and selection station operable by a user, the user interface system capable of receiving from the control system an identification of the content of the received media disc, communicating to the user a buy-back price provided by the control system for the received media disc, and directing credit of a user account for the buy-back price of the received media disc.

2. The system of receiving prerecorded media discs from users as claimed in claim 1 where the user interface system is also capable of transferring the received disc to the optical disc identification system.

3. The system of receiving prerecorded media discs from users as claimed in claim 1 where the optical disc identification system is part of the user interface system and is adapted to read the native bar code on receipt of the media disc from the user.

4. The system of receiving prerecorded media discs from users as claimed in claim 1 where the user interface system is also capable of receiving a user identification of the content of the prerecorded media disc and communicating such user identification to the control system, and the control system is capable of comparing the user identification of the content of the prerecorded disc media with the content identified by the native bar code.

5. The system of receiving prerecorded media discs from users as claimed in claim 1 where the user interface system is capable of receiving from the control system an identification of a prerecorded media disc read by optical disc identification system and displaying such identification to the user.

6. The system of receiving prerecorded media discs users as claimed in claim 1 where the optical disc identification system is capable of checking the quality of the prerecorded media disc and the user interface is also capable of dispensing back to the user a received disc that does not meet a given quality standard.

7. The system of receiving prerecorded media discs from users as claimed in claim 1 where the optical disc identification system is capable of checking the quality of the media disc and transferring a measure of the quality to the control system, and the control system is capable of adjusting the buy-back price displayed to the user by the user interface system based on the measured quality of the received media disc.

8. The system of receiving prerecorded media discs from users as claimed in claim 1 further comprising
    a communication system capable of at least periodically updating a buy-back price database with prices for used prerecorded media discs.

9. The system of receiving prerecorded media discs from users as claimed in claim 8 where the communication system provides a continual updating of the prices for used prerecorded media discs.

10. The system of receiving prerecorded media discs from users as claimed in claim 1 where the control system is capable of instructing the user interface system to dispense back to the user a received media disc that cannot be identified by the native bar code.

11. The system of receiving prerecorded media discs from users as claimed in claim 1 where the control system is capable of identifying a prerecorded media disc whose native bar code is not present in the library and updating the library associating such native bar code with the content of the prerecorded media disc.

12. The system of receiving prerecorded media discs from users as claimed in claim 11 where the library communicates with other like control systems, and is capable of verifying an association of such newly added native bar code with content of prerecorded media disc identified by the control system.

13. The system of receiving prerecorded media discs from users as claimed in claim 12 where the control system is also capable of directing debit of a credit previously issued to a user for a buy-back price paid for a received disc when the control system is unable to verify the association between the native bar code and the identification of the prerecorded media disc.

14. The system of receiving prerecorded media discs from users as claimed in claim 1 where the user interface system is capable of reading a bar code from a case associated with the content of the received disc and transferring such identification of the case bar code to the control system, and where the control system is capable of comparing the disc content associated with the case bar code with the disc content associated with the native bar code of the received disc identified by the optical disc identification system and directing the user interface system to inform the user when the disc content associated with the native bar code does not agree with the disc content associated with the case bar code.

15. The system of receiving prerecorded media discs from users as claimed in claim 14 where the optical disc identification system comprises:
    a disc holder adapted to support a received media disc to expose a center hub of the media disc,
    a light source positioned to illuminate at least a portion of the hub of the media disc in the disc holder, a sensor capable of capturing a digital image of at least a portion of the hub including a native bar code on the media disc, and an image processor capable of reading the native bar code from the digital image.

16. The system of receiving prerecorded media discs from users as claimed in claim 1 where the optical disc identification system is capable of capturing a digital image of at least a portion of a center hub of a received media disc containing a native bar code and reading the native bar code from the digital image of the hub of the received media disc.

17. The system of receiving prerecorded media discs from users as claimed in claim 1 where the optical disc identification system comprises:

a disc holder adapted to support a received media disc to expose a center hub of the media disc, a light source positioned to illuminate at least a portion of the hub of the media disc in the disc holder, a sensor capable of capturing a digital image of at least a portion of the hub including a native bar code on the media disc, and an image processor capable of reading the native bar code from the digital image.

18. The system of receiving prerecorded media discs from users as claimed in claim 17 where the optical disc identification system further comprises:

a mirror positioned to reflect an image of a surface of the received media disc illuminated by the light source, where the sensor is capable of capturing the reflected image from the mirror of at least a portion of the surface of the media disc through an opening in the center hub of the media disc, and where the control system is capable of accessing a library of art work associated with content of prerecorded media discs and is capable of comparing the reflected image captured by the sensor with the art work in the library to identify the content of the received media disc.

19. The system of receiving prerecorded media discs from users as claimed in claim 17 where the optical disc identification system further comprises:

a second light source positioned to illuminate at least a portion of a surface of the received media disc opposite the first light source, a second sensor capable of capturing a digital image of at least a portion of the surface of the media disc illuminated by the second light source and transferring that digital image to the control system, and where the control system is capable of accessing a library of art work associated with content of prerecorded media discs and is capable of comparing the digital image captured by the second sensor with the art work in the library to identify the content of the received media disc.

20. The optical disc identification system as claimed in claim 17 where the light source positioned to illuminate at least a part of the hub of the received media disc positioned in the disc holder is capable of producing light selected from the group consisting of indirect light, diffused light, and dispersed light.

21. The system of receiving prerecorded media discs from users as claimed in claim 1 where the prerecorded media discs are bare discs.

22. The system of receiving prerecorded media discs from users as claimed in claim 1 where the prerecorded media disc may be in a case and the optical disc identification system is capable of reading the native bar code on the received media disc through a window in the case.

23. The system of receiving prerecorded media discs from users as claimed in claim 1 where the prerecorded media disc may be in a case and the optical disc identification system is capable of reading the native bar code on the received media disc through an opening in the case.

24. The system of receiving prerecorded media discs from users as claimed in claim 1 where the prerecorded media discs are selected from the group consisting of CD's, DVD's, HD DVD's, Blu-ray® discs, Wii® games, Playstation® games, Nintendo® games, Xbox® games and a mixture thereof.

25. A system of receiving prerecorded media discs from users comprising:

a control system having a processor capable of accessing a library associating native bar codes with content of prerecorded media discs, receiving the identification of a native bar code of a prerecorded media disc from an optical disc identification system adapted to read a native bar code on a prerecorded media disc and receiving the identification of the content of said media disc by a disc drive capable of reading at least part of the content of the prerecorded media discs, identifying the content of the prerecorded media read by the optical disc identification system and the content of prerecorded media disc identified by the disc drive, comparing the content of the received media disc identified by the native bar code with that identified by the disc drive, transferring information to a user interface when the identified contents do not match, directing a disc transfer system to store the prerecorded media discs in selected locations of a disc storage system, and storing in a memory system the selected location and content of each prerecorded media disc, and the user interface system operably connected to the control system and adapted to receive a prerecorded media disc from a user, and including a buy-back activator and at least one browsing and selection station operable by a user, the user interface system is capable of receiving from the control system an identification of the content of the received disc, communicating to the user a buy-back price provided by the control system for the received disc, and directing credit of a user account for the buy-back price of the received disc.

26. The system of receiving prerecorded media discs from users as claimed in claim 25 where the user interface system is also capable of issuing a credit or debit to the user for the buy-back price of the received media disc based on comparing the contents identified by the optical identification system and by the disc drive.

27. The system of receiving prerecorded media discs from users as claimed in claim 25 where the user interface system is capable of transferring the received disc to the optical disc identification system.

28. The system of receiving prerecorded media discs from users as claimed in claim 25 where the optical disc identification system is part of the user interface system and is adapted to read the native bar code on receipt of the media disc from the user.

29. The system of receiving prerecorded media discs from users as claimed in claim 25 where the user interface system is capable of receiving a user identification of the content of a prerecorded media disc and communicating such user identification to the control system, and the control system is capable of comparing the user identification of the content of the prerecorded disc media with the content identified by the native bar code.

30. The system of receiving prerecorded media discs from users as claimed in claim 25 where the user interface system is capable of receiving from the control system an identification of a prerecorded media disc read by the optical disc identification system and displaying such identification to the user.

31. The system of receiving prerecorded media discs from users as claimed in claim 25 where the optical disc identification system is capable of checking the quality of the prerecorded media disc and the user interface is capable of dispensing back to the user a received disc that does not meet a given quality standard.

32. The system of receiving prerecorded media discs from users as claimed in claim 25 where the optical disc identification system is capable of checking the quality of the media disc and transferring a measure of the quality to the control system, and the control system is capable of adjusting the buy-back price displayed to the user by the user interface system based on the measured quality of the received media disc.

33. The system of receiving prerecorded media discs from users as claimed in claim 25 further comprising
a communication system capable of at least periodically updating a buy-back price database with prices for used prerecorded media discs.

34. The system of receiving prerecorded media discs from users as claimed in claim 25 where the communication system provides a continual updating of the prices for used prerecorded media discs.

35. The system of receiving prerecorded media discs from users as claimed in claim 25 where the control system is capable of instructing the user interface system to dispense back to the user a received media disc that cannot be identified by the native bar code.

36. The system of receiving prerecorded media discs from users as claimed in claim 25 where the control system is capable of identifying a prerecorded media disc whose native bar code is not present in the library and updating the library associating such native bar code with the content of the prerecorded media disc.

37. The system of receiving prerecorded media discs from users as claimed in claim 36 where the library communicates with other like control systems, and is capable of verifying an association of such newly added native bar code with content of a prerecorded media disc identified by the control system.

38. The system of receiving prerecorded media discs from users as claimed in claim 37 where the control system is capable of directing debit of a credit previously issued to a user for a buy-back price paid for a received disc when the control system is unable to verify the association between the native bar code and the identification of the prerecorded media disc.

39. The system of receiving prerecorded media discs from users as claimed in claim 25 where the user interface system is capable of reading a bar code from a case associated with the content of the received disc and transferring such identification of the case bar code to the control system, and where the control system is capable of comparing the disc content associated with the case bar code with the disc content associated with the native bar code of the received disc identified by the optical disc identification system and directing the user interface system to inform the user when the disc content associated with the native bar code does not agree with the disc content associated with the case bar code.

40. The system of receiving prerecorded media discs from users as claimed in claim 39 where the optical disc identification system comprises:
a disc holder adapted to support a received media disc to expose a center hub of the media disc,
a light source positioned to illuminate at least a portion of the hub of the media disc in the disc holder,
a sensor capable of capturing a digital image of at least a portion of the hub including a native bar code on the received media disc, and
an image processor capable of reading the native bar code from the digital image.

41. The system of receiving prerecorded media discs from users as claimed in claim 25 where the optical disc identification system is capable of capturing a digital image of at least a portion of a center hub of a received media disc containing a native bar code and reading the native bar code from the digital image of the hub of the received media disc.

42. The system of receiving prerecorded media discs from users as claimed in claim 25 where the optical disc identification system comprises:
a disc holder adapted to support a received media disc to expose a center hub of the media disc,
a light source positioned to illuminate at least a portion of the hub of the media disc in the disc holder,
a sensor capable of capturing a digital image of at least a portion of the hub including a native bar code on the media disc, and
an image processor capable of reading the native bar code from the digital image.

43. The system of receiving prerecorded media discs from users as claimed in claim 42 where the optical disc identification system further comprises:
a mirror positioned to reflect an image of a surface of the received media disc illuminated by the light source,
where the sensor is capable of capturing the reflected image from the mirror of at least a portion of the surface of the media disc through an opening in the center hub of the received media disc, and
where the control system is capable of accessing a library of art work associated with content of prerecorded media discs and is capable of comparing the reflected image captured by the sensor with the art work in the library to identify the content of the received media disc.

44. The system of receiving prerecorded media discs from users as claimed in claim 42 where the optical disc identification system further comprises:
a second light source positioned to illuminate at least a portion of a surface of the received media disc opposite the first light source,
a second sensor capable of capturing a digital image of at least a portion of the surface of the received media disc illuminated by the second light source and transferring that digital image to the control system, and
where the control system is capable of accessing a library of art work associated with content of prerecorded media discs and is capable of comparing the digital image captured by the second sensor with the art work in the library to identify the content of the received media disc.

45. The optical disc identification system as claimed in claim 42 where the light source positioned to illuminate at least a part of the hub of the received media disc positioned in the disc holder is capable of producing light selected from the group consisting of indirect light, diffused light, and dispersed light.

46. The system of receiving prerecorded media discs from users as claimed in claim 25 where the prerecorded media discs are bare discs.

47. The system of receiving prerecorded media discs from users as claimed in claim 25 where the prerecorded media disc may be in a case and optical disc identification system is capable of reading the native bar code on the received media disc through a window in the case.

48. The system of receiving prerecorded media discs from users as claimed in claim 25 where the prerecorded media disc may be in a case and optical disc identification system is capable of reading the native bar code on the received media disc through an opening in the case.

49. The system of receiving prerecorded media discs from users as claimed in claim 25 where the media discs are selected from the group consisting of CD's, DVD's, HD DVD's, Blu-ray® discs, Wii® games, Playstation® games, Nintendo® games, Xbox® games and mixture thereof.

50. An optical disc identification system comprising:
    a disc holder adapted to support a non-rotating prerecorded media disc to expose a center hub of the media disc,
    a light source positioned to illuminate at least a portion of the hub of the non-rotating prerecorded media disc in the disc holder,
    a sensor capable of capturing a digital image of at least a portion of the hub including a native bar code on the non-rotating prerecorded media disc, and
    an image processor capable of reading the native bar code from the digital image, where the image processor is capable of selecting a linear section of the digital image and determining if the linear section intersects a portion of a native bar code.

51. The optical disc identification system as claimed in claim 50 further comprising:
    a mirror positioned to reflect an image of a surface of the media disc illuminated by the light source,
    where the sensor is capable of capturing the reflected image from the mirror of at least a portion of the surface of the media disc through an opening in the center hub of the media disc, and
    the image processor is capable of comparing the reflected image captured by the sensor with a library of art work associated with the content of prerecorded media discs to identify the content of the media disc.

52. The optical disc identification system as claimed in claim 50 further comprising:
    a second light source positioned to illuminate at least a portion of a surface of the media disc opposite the first light source,
    a second sensor capable of capturing a digital image of at least a portion of the surface of the media disc illuminated by the second light source and transferring that image to the image processor,
    where the image processor is capable of comparing the digital image captured by the second sensor with a library of artwork associated with the content of prerecorded media discs to identify the content of the media disc.

53. The optical disc identification system as claimed in claim 50 where the light source positioned to illuminate at least a part of the hub of the received media disc positioned in the disc holder is capable of producing light selected from the group consisting of indirect light, diffused light, and disperse light.

54. The optical disc identification system as claimed in claim 50 where the sensor has an adjustable focal length.

55. The optical disc identification system as claimed in claim 50 where the image processor is capable of identifying an approximate location of the center of the media disc and mapping concentric ellipses from successive approximations of the center of the media disc to identify and read the native bar code of the media disc.

56. The optical disc identification system as claimed in claim 50 where the image processor is capable of reading at least a portion of the native bar code and reporting the identified portion of the native bar code to a control system.

57. The optical disc identification system as claimed in claim 50 where the disc holder comprises a pair of disc supports capable of maintaining the media disc on an pivot to facilitate movement of the disc within the disc identification system.

58. The optical disc identification system as claimed in claim 57 where the disc supports are formed of non-scratching material.

* * * * *